United States Patent [19]

Hamada

[11] 3,845,394

[45] Oct. 29, 1974

[54] BROADCAST RECEIVER

[75] Inventor: Osamu Hamada, Tokyo, Japan

[73] Assignee: Sony Corporation, Tokyo, Japan

[22] Filed: Nov. 27, 1972

[21] Appl. No.: 309,803

[30] Foreign Application Priority Data

Nov. 29, 1971 Japan .............................. 46-96056

[52] U.S. Cl. .................. 325/455, 325/464, 325/470

[51] Int. Cl. .............................................. H04b 1/26

[58] Field of Search ............ 324/77 C, 77 CS, 78 R, 324/79; 325/307, 334, 335, 423, 432, 455, 459, 460, 464, 465, 470, 351; 328/39; 340/173 SP, 174 M, 173 R; 331/64

[56] References Cited

UNITED STATES PATENTS

| | | | |
|---|---|---|---|
| 3,129,418 | 4/1964 | De La Tour | 340/173 SP |
| 3,244,983 | 4/1966 | Ertman | 325/455 |
| 3,354,440 | 11/1967 | Farber et al. | 340/173 R |
| 3,600,683 | 8/1971 | Martin | 325/423 |
| 3,657,658 | 4/1972 | Kubo | 328/39 |
| 3,665,318 | 5/1972 | Hoffman | 325/455 |
| 3,714,585 | 1/1973 | Koch | 325/335 |
| R25,599 | 6/1964 | Tate | 340/174 M |
| R25,660 | 10/1964 | Modlinski | 340/174 M |

*Primary Examiner*—Benedict V. Safourek
*Assistant Examiner*—Jin F. Ng
*Attorney, Agent, or Firm*—Lewis H. Eslinger, Esq.; Alvin Sinderbrand, Esq.

[57] ABSTRACT

A broadcast receiver having a tuner with a variable local oscillator for generating a local frequency signal, a divider for dividing the local frequency signal by a variable dividing ratio, a comparator for comparing the divided local frequency signal with a reference signal and producing a corresponding output by which the local oscillator frequency is controlled, a counter having a variable content by which the dividing ratio of the divider is determined for establishing the radio broadcast frequency to which the receiver is tuned, and a pulse generator operative to vary the counter content; is further provided with means for detecting the reception of radio waves by the receiver, a memory having memory elements each corresponding to a respective counter content and in which a signal is stored when the reception of radio waves is detected for that content of the counter, whereby to memorize those broadcasting stations from which the transmissions can be received, and a display device having indicator elements respectively corresponding to the memory elements and by which the storage of signals in the respective memory elements is visually indicated. Various control circuits are provided, for example, to operate the pulse generator until the receiver is tuned to a selected receivable station determined by actuation of the respective indicator element, or until the receiver is tuned to the receivable station broadcasting with the next lower frequency, or to operate the pulse generator for scanning the broadcasting band with pauses at each of the receivable stations identified by the storage of signals in the respective memory elements.

85 Claims, 52 Drawing Figures

| RADIO FREQ. | LOCAL FREQ. | FREQ. OF MIX (6) | FREQ. OF $\frac{1}{4}$ DIV. | DIV. RATIO | CONTENT OF STN. SEL. COUNTER | NUMERICAL CONST. |
|---|---|---|---|---|---|---|
| 76.1 MHz | 65.4 MHz | 800 KHz | 200 KHz | 8 | 138 | 146 |
| 76.2 | 65.5 | 900 | 225 | 9 | 137 | 146 |
| ⋮ | ⋮ | ⋮ | ⋮ | ⋮ | ⋮ | ⋮ |
| 89.9 | 79.4 | 14600 | 3650 | 146 | 000 | 146 |

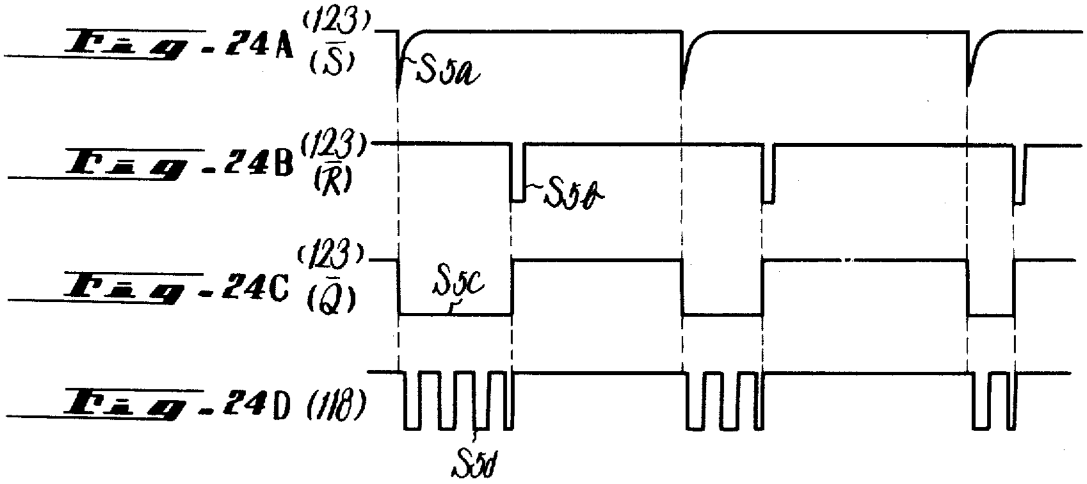
Fig-24A
Fig-24B
Fig-24C
Fig-24D
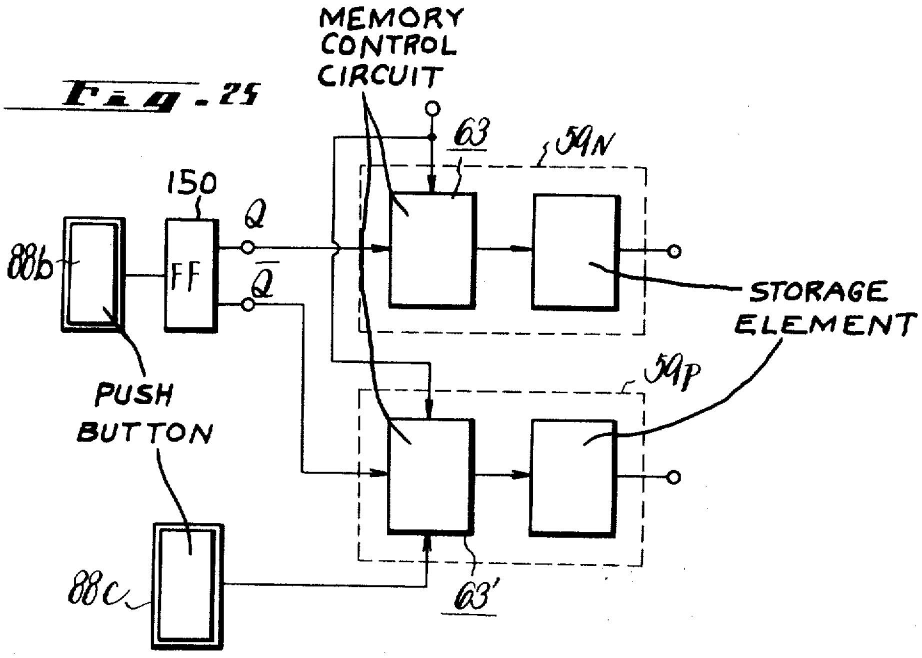
Fig-25

BROADCAST RECEIVER

This invention relates generally to broadcast receivers, and more particularly is directed to improved arrangements for tuning such receivers to the frequencies of selected broadcasting stations.

In general, the radio wave broadcast by a desired station is selected for reception by a radio receiver by varying the local frequency of a local oscillator incorporated in the tuner of the receiver. As the means for varying the local frequency of the above mentioned local oscillator, it has been conventional to use a variable condenser. In such a case, if the user does not know the assigned frequency of the desired radio or television station or channel, the user must refer to the listing of the broadcast frequencies of the stations published in newspapers or magazines or must actuate the variable condenser of the tuner so as to search for the selected broadcast frequency.

Since the variable condenser is manually operated, even if the receiver is provided with a tuning meter, accurate tuning is not always possible. Moreover, it is bothersome for the user to rotate the knob of the tuner every time the receiver is to be tuned to another station or channel. In order to avoid the foregoing disadvantages, an automatic tuning system has been proposed in which the output of an intermediate frequency amplifier incorporated in the receiver is detected and the local oscillator has its frequency adjusted in dependence on the output thus detected. Receivers having this kind of automatic tuning system are often used in automobile radios rather than in radios intended for household use. The receivers having such automatic tuning systems have disadvantages in that search-stop operations must frequently be repeated when many stations are present, and correct tuning is not always ensured.

Receivers which avoid interference between adjacent stations are particularly desirous for users who live in districts within the broadcasting range of a large number of stations. Receivers for use in such districts are required to have a relatively high frequency sensitivity. In order to solve this problem, an AM and FM receiver has been proposed that uses a phase locked loop, for example, as described in Fairchaild Semiconductor's application by J. Stinehelfer and J. Nichols, 1969, entitled "A Digital Frequency Synthesizer for an AM and FM Receiver". Such frequency synthesizer for tuning an FM and AM radio mainly consists of a voltage-controlled oscillator, a programmable divider, a frequency and phase comparator, and a reference frequency generator. The voltage-controlled oscillator is the local oscillator of the tuner, and the output signal of the voltage-controlled oscillator is divided by the programmable divider, whereupon the signal thus divided is compared, in the comparator, as to frequency and phase, with the crystal-controlled reference signal. The resulting voltage output of the frequency and phase comparator controls the voltage-controlled oscillator so that the frequency of the latter $f(VCO)$ will satisfy the following equation:

$$f(VCO)/N = f_{ref} \quad (1)$$

or $$f(\mathrm{VCO}) = f_{ref} N \quad (2)$$

which indicates that frequencies may be generated that are integer multiples of the reference frequency. The frequency generated is determined by the divide ratio N of the programmable divider.

The FM broadcast band in the United States consists of 100 channels 200 KHz wide starting at 88.0 MHz. The carrier for the first channel is at 88.1 MHz, and the carrier for the last channel is at 107.9 MHz. The divider used in the foregoing frequency synthesizer may be a down counter. This counter is loaded with the value of the divide ratio on the next clock pulse after the counter has counted down to 1. All other clock pulses will result in the counter counting down by 1. If the one state of this counter is used to produce an output, then that output will occur once for every N input pulse, where N is the value preset into the counter. For example, if the counter is preset to 5 and counts down to 1, and then repeats the cycle, the counter will count as follows: 54321 54321 etc. Of course, it may also be possible to use an up counter as the divider, in which case, the counter counts 12345 12345 etc.

In the system described above, the voltage-controlled oscillator controlled by the output of the comparator is capable of generating an accurate local frequency so that it is possible to effect correct tuning. However, even in such system the divide ratio N has to be selected, for example, by actuation of buttons on which are indicated corresponding frequencies, so that the user must again know the broadcast frequency of the station to be selected.

Accordingly, it is an object of this invention to provide a broadcast receiver with an improved arrangement by which the receiver can be conveniently and accurately tuned to receive the radio waves transmitted by selected broadcasting stations.

Another object is to provide a broadcast receiver in which accurate tuning thereof for the reception of a selected station can be achieved without requiring any skill on the part of the operator.

A further object is to provide a broadcast receiver in which the broadcast frequency band is divided into a number of sections and the sections thus divided are visually indicated.

Still another object of the invention is to provide a broadcast receiver which can simultaneously display the broadcast frequencies of those stations within the range of which the receiver is located.

A still further object of the invention is to provide a broadcast receiver which can simultaneously display the broadcast frequencies of those stations capable of being adequately received by the receiver, and which can conveniently select a desired one of those stations and accurately receive the radio wave broadcast by the station thus selected.

A further object of the invention is to provide a broadcast receiver having a divider for dividing the broadcast frequency band into a number of sections and a memory for storing signals corresponding to the divided sections which represent frequencies receivable by the receiver at a particular location of the latter.

Another object is to provide a broadcast receiver, as aforesaid, wherein the signals read out of the memory are capable of energizing respective display elements of a display device for indicating those stations capable of being received.

A further object of the invention is to provide a broadcast receiver, as aforesaid, in which the memory consists of a number of memory elements and the display device consists of a corresponding number of display elements, which memory and display elements are arranged in respective matrices and are energized by address signals common to both matrices.

A still further object is to provide a broadcast receiver, as aforesaid, with a first memory for storing the frequencies of all stations capable of being received by the receiver at a particular location, a second memory for selectively storing one or more of the frequencies stored by the first memory, and a arrangement by which the receiver can be conveniently tuned to receive a selected one of the frequencies stored in the second memory.

A still further object is to provide a broadcast receiver, as aforesaid, in which, when desired, the frequency output of the local oscillator can be varied in a step-wise manner for tuning the receiver to the frequency of any radio waves that may be received at the location of the receiver.

The above, and other objects, features and advantages of the invention, will become apparent from the following detailed description of illustrative embodiments which is to be read in connection with the accompanying drawings forming part of this application, and wherein:

FIG. 1 if a block diagram showing the essential components of a broadcast receiver according to the invention;

FIGS. 24A to 24D show waveforms to which reference will be made in explaining the operation of the circuit shown in FIG. 23; and FIG. 25 is a block diagram of an arrangement provided for changing-over the memory.

The invention will now be described in detail with reference to an embodiment thereof applied to an FM receiver.

Figure 1:
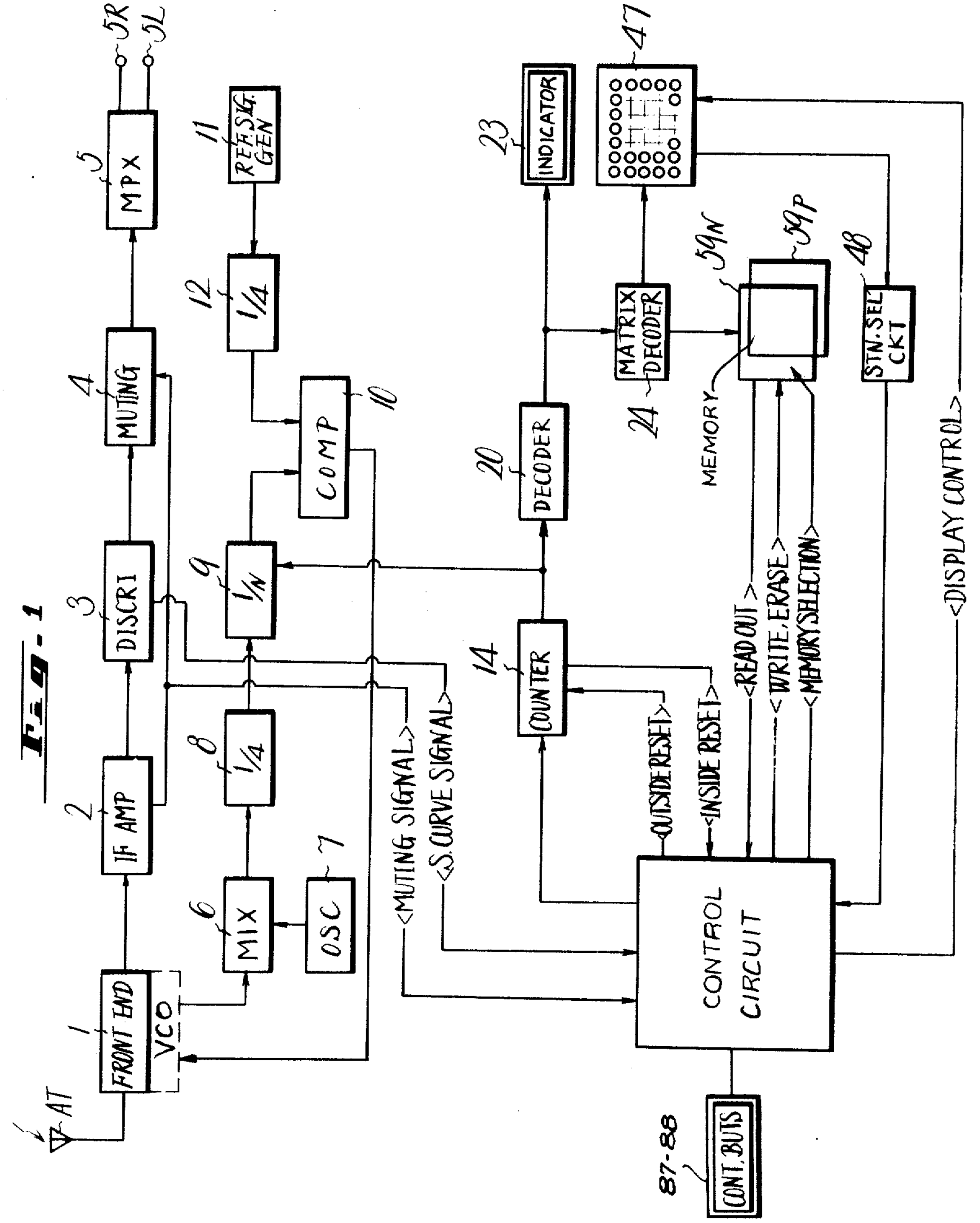

As shown in FIG. 1, in such FM receiver, radio waves broadcast from a number of stations are received by an antenna AT whose output is supplied to a front end 1 which includes a RF amplifier, a voltage-controlled local oscillator and a mixer. The voltage-controlled oscillator of front end 1 has a variable capacity diode and is adapted to change its oscillating frequency in response to changes in the level of a control voltage within a range, for example, from 65.4 to 79.2 MHz. To the front end 1 are connected, in order, an intermediate frequency amplifier 2, an FM discriminator 3, a muting circuit 4, and a stereo multiplexer 5 having output terminals 5R and 5L from which are obtained a right stereo signal and a left stereo signal, respectively.

In general, the oscillating frequency of the voltage-controlled local oscillator of front end 1 is extracted and divided, and the resulting divided signal is compared in frequency and phase with a reference signal. The compared output is fed back to the local oscillator as a control voltage therefor so as to select a desired station. In practice, the frequency band of the local oscillator output is a VHF band so that the local oscillating output is, in the first place, supplied to a mixer 6 and 1/4 divider 8 so as to effect frequency demultiplication and then supplied through a 1/N divider 9 to a frequency and phase comparator 10. The mixer 6 is supplied with the output of an oscillator 7 consisting of a crystal oscillator and which has a suitably selected frequency, for example, 64.6 MHz, so that the mixer 6 feeds to the divider 8 the frequency difference between the frequency of the local oscillator in front end 1 and the frequency of oscillator 7. The frequency and phase comparator 10 receives the oscillating output, for example, with a frequency of 100 KHz, generated by a reference signal generator 11 and supplied to comparator 10 through a 1/4 divider 12. The frequency and phase comparator 10 produces a direct current voltage output depending upon the phase difference between the two input signals from dividers 9 and 12, this direct current voltage being employed as the control voltage of the local oscillator in front end 1 for determining the oscillating frequency thereof. The above mentioned circuit arrangement is well known, and therefore its details will not be described.

In the stable state of the phase-locked-loop for effecting the frequency comparison, the following equation results from the above values for the frequencies of the oscillating outputs of oscillator 7 and reference signal generator 11:

$$(f - 64.6)/4N = 0.1/4 \quad (1)$$

where $f$ is the oscillating frequency of the voltage-controlled local oscillator in front end 1. Equation 1 can be rewritten as:

$$f = 64.6 + 0.1N \quad (2)$$

Thus, if the divide ratio N of the 1/N divider 9 is changed over the range from 8 to 146, $f$ can be changed from 65.4 to 79.2 MHz in steps of 100 KHz. In view of the standard 10.7 MHz IF, the change of the divide ratio N from 8 to 146 permits the FM broadcast frequencies within the frequency band from 76.1 MHz to 89.9 MHz to be received and selected in dependence on the divide ratio N of divider 9.

Figures 2, 3:
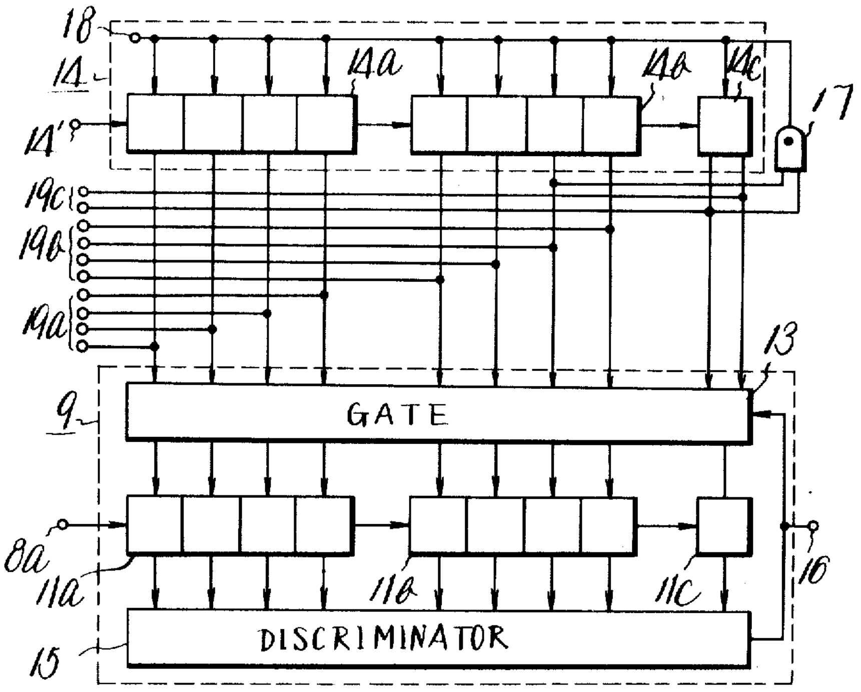
FIG. 2 is a block diagram of the station select counter and divider of FIG. 1.
FIG. 3 is a table showing the relationship between the frequencies of the several stations of the FM broadcast band used in Japan, and the divide ratios and contents of the counter that correspond to such stations.

In the embodiment of the invention illustrated by FIG. 2, the 1/N divider 9 is shown to have a terminal 8*a* receiving the phase signal from 1/4 divider 8, and from which this pulse signal is supplied to binary counters 11*a*, 11*b* and 11*c*.

The binary counter 11*a* is adapted to convert the first figure of the decimal number, that is, the figure representing 100 KHz, into BCD (Binary-Coded Decimal), the counter 11*b* is adapted to convert the second figure of the decimal number into BCD, and the counter 11*c* is adapted to convert the third figure into the binary output. As will be described later, the counter 11*c* need only provide the binary output 1 or 0 for representing the third figure of the decimal number so that it may be constituted, for example, by a single flip-flop. The outputs from these counters 11*a*, 11*b* and 11*c* are supplied to a discriminator 15 which discriminates whether or not the contents of counters 11*a*, 11*b* and 11*c* correspond to given numbers, and which controls a gate 13. More specifically, when the contents of counters 11*a*, 11*b* and 11*c* are given numerical constants, the gate 13 is opened, and the counters 11*a*, 11*b* and 11*c* are set through the open gate 13 to the contents of similar counters 14*a*, 14*b* and 14*c* of a station select counter 14. Whenever the contents of the counters 11*a*, 11*b* and 11*c* become the given numerical constant, the above mentioned operation is repeated. The content of the station select counter 14 is synchronized with counter operating clock pulses supplied thereto by way of a terminal 14' and is determined by the number of the station select pulses formed in a control circuit CTL (FIG. 1), as will be described later. When the content of the station select counter 14 becomes, for example, [140], the station select counter 14 produces a reset signal at the output of an AND gate 17 (FIG. 2) to reset itself, that is, to effect an inside reset. The reset signal may also be supplied from the outside to a terminal 18 so as to effect an outside reset of the station select counter 14.

The discriminator 15 provides a pulse signal at output terminal 16 each time a pulse signal, whose number is equal to the difference between the given numerical constant and the content of station select counter 14, is supplied to terminal 8*a*. Thus, it is possible to determine the divide ratio N of the 1/N divider 9 by means of the content of the station select counter 14, and, as a result, the radio band is divided by cooperative action of the 1/N divider 9 and the station select counter 14.

In the present embodiment, the content of the station select counter 14 is such that the following equation is satisfied with respect to each station transmitting frequency of the FM broadcast band:

(The content of the station select counter 14) = 89.9 (number of three figures representing the station transmitting frequency).

That is, the content of the station select counter 14 is the numerical complement of the three figures representing the station transmitting frequency with respect to [89.9]. This complemental number corresponds to the station transmitting frequencies with a ratio of 1:1. The given numerical constant is a number which is equal to the sum of the complemental number and the divide ratio N. The relationships of the divide ratio N, the content of the station select counter 14 (complemental number) and the given numerical constant (N + complemental number) of each station transmitting frequency in the FM band used in Japan is shown in FIG. 3. The above will be more fully understood from the following concrete numerical examples.

In the case of receiving a FM broadcast frequency of, for example, 76.1 MHz, a station select pulse signal is supplied from the terminal 14 so as to set the content of station select counter 14 to [138], that is, to the complemental number which corresponds to the stated frequency. A pulse signal is supplied from 1/4 divider 8 through the terminal 8*a* to the counters 11*a*, 11*b* and 11*c*. When the contents of counters 11*a*, 11*b* and 11*c* become the given numerical constant, that is, become [146], this content is discriminated by the discriminator 15. As a result, one pulse signal is supplied to the terminal 16 and the gate 13 is opened to set the counters 11*a*, 11*b* and 11*c* to [138], that is, to the content of station select counter 14. Then, the counters 11*a*, 11*b* and 11*c* require eight pulse signals from divider 8 to restore the content of these counters to [146], whereupon, discriminator 15 is operated to supply one pulse signal from the terminal 16 and to again open the gate 13 for resetting the counters 11*a*, 11*b* and 11*c* to [138]. In this manner, the pulse signal from the terminal 8*a* is divided by the divide ratio "8". If it is desired to receive any of the other FM broadcast frequencies (76.2 MHz to 89.9 MHz), the content of station select counter 14 may be set to the complemental number corresponding to the FM broadcast frequency to be received. If the content of the station select counter 14 is varied from [000] to [138] in succession, the entire FM frequency band from 89.9 MHz to 76.1 MHz may be scanned in steps or increments of 100 KHz. As described above, the station select counter 14 may be designed to be inside reset by the output of AND gate 17 when the content of station select counter 14 becomes [140] (which would correspond to the reception of a broadcast frequency of 76.0 MHz) for the purpose of simplifying the circuit arrangement.

Figure 4A:
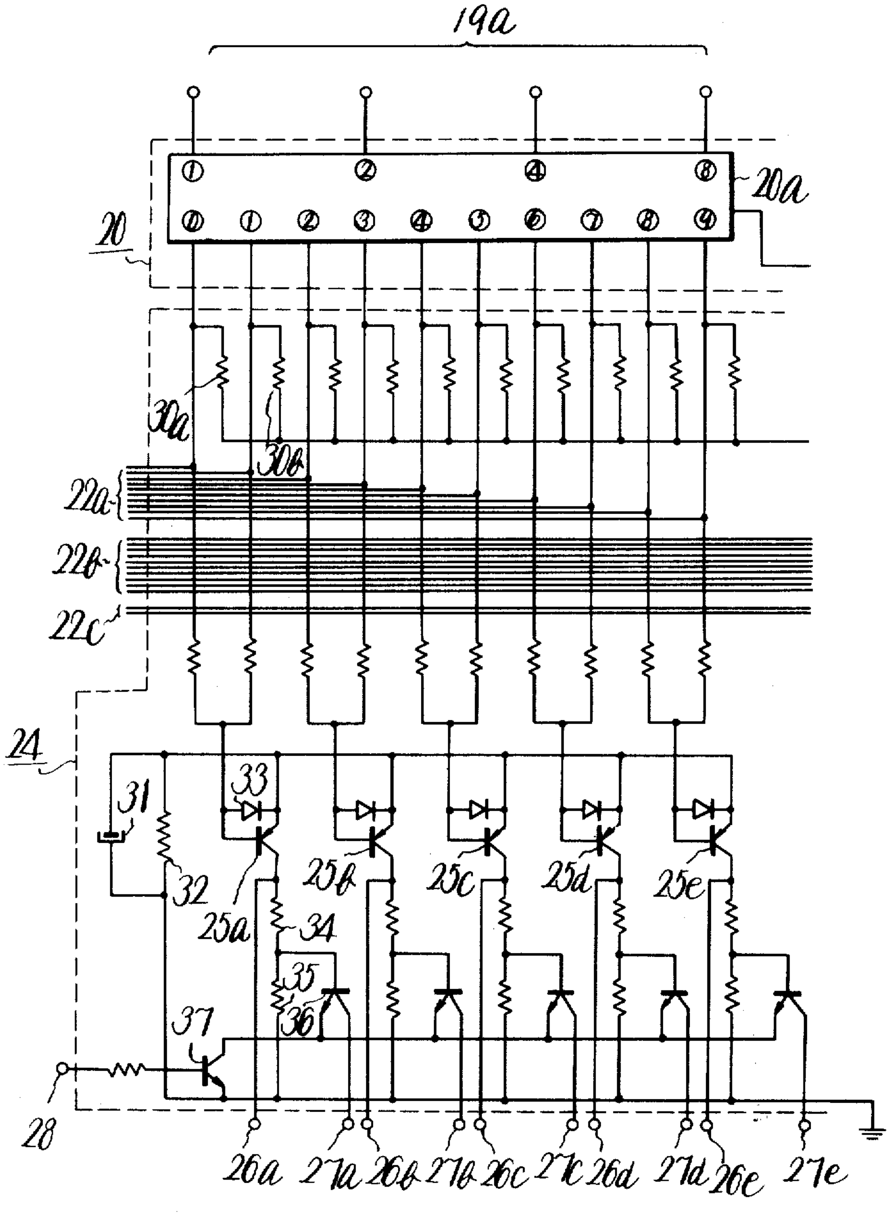
FIGS. 4A and 4B are a circuit diagram showing connections between the binary-decoder and the matrix decoder of FIG. 1.
Figure 4B:
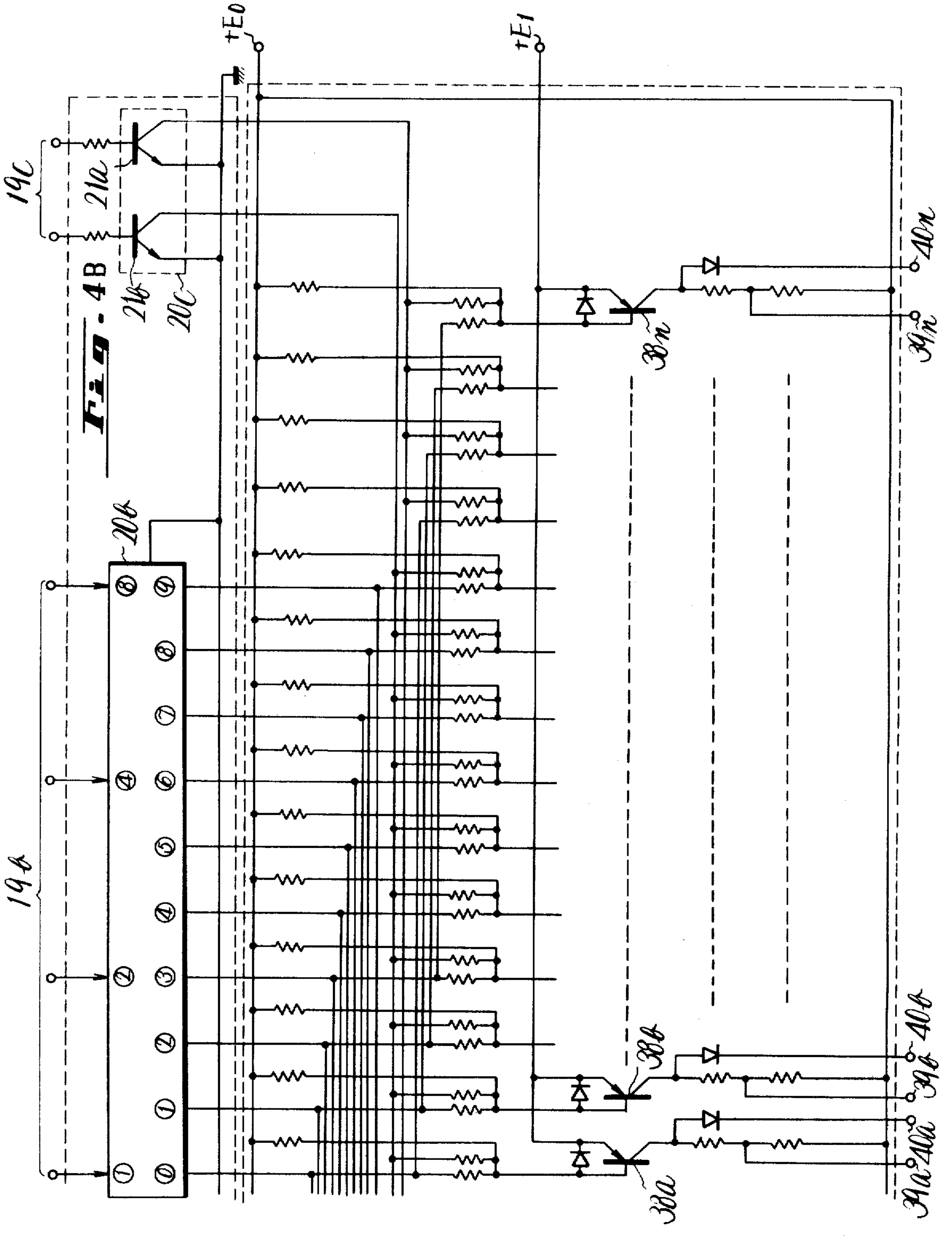

As further shown on FIG. 2, the contents of the counters 14a, 14b and 14c of station select counter 14 (this content is given as BCD) are obtained at groups of terminals 19a, 19b and 19c, respectively, and these binary outputs are supplied to a binary-decimal decoder 20 (FIG. 1). In FIGS. 4A–4B, binary-decimal decoder 20 is shown to consist of binary-decimal decoder sections 20a, 20b and 20c which are supplied with the binary outputs obtained at the terminal groups 19a, 19b and 19c, respectively. The binary-decimal decoder section 20a is adapted to convert the content of station select counter 14a, that is, BCD relating to the first figure of the complemental number, into the corresponding decimal number. Similarly, binary-decimal decoder section 20b is adapted to convert the content of station select counter 14b, that is, BCD relating to the second figure of the complemental number, into the corresponding decimal number, and binary-decimal decoder section 20c is adapted to convert the content of station select counter 14c, that is, BCD relating to the third figure of the complemental number, into the corresponding decimal number.

Since the third figure of the complemental number is always either 0 or 1, decoder selection 20c need not be constructed as a true decoder, and, as shown, it may consist of transistors 21a and 21b by which the presence of an output at either one of the two terminals 19c is detected.

Figure 14:
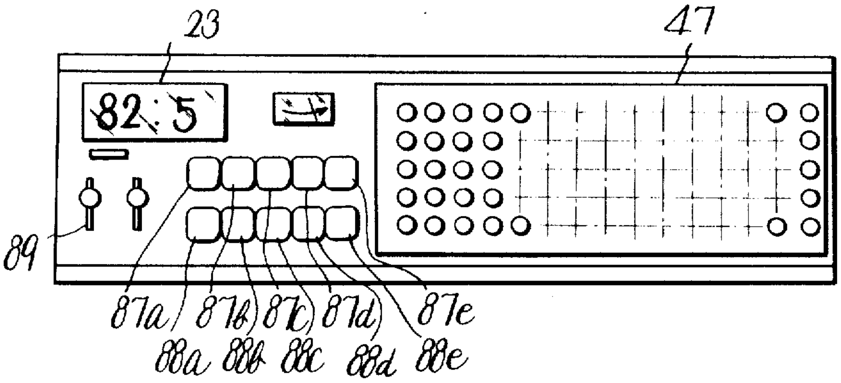
FIG. 14 is a front elevational view of the broadcast receiver according to the invention.

The decimal outputs from binary-decimal decoder 20 corresponding to the first, second and third figures are obtained at groups of terminals 22a, 22b and 22c, respectively. These terminals 22a, 22b and 22c are connected to respective indicator devices included in a radio frequency indicator device 23 (FIGS. 1 and 14), such indicator devices may comprise, for example, three conventional Nixie indicator tubes. Since the decimal output of binary-decimal decoder 20 is a complemental number with respect to the radio frequency, the connections between terminals 22a, 22b and 22c and the cathodes of the Nixie tubes have to be reversed. For example, the output [0] from the binary-decimal decoder section 20a relating to the first figure, that is, the figure of 100 KHz is supplied to the cathode [9] of the Nixie indicator tube, the output [1] is supplied to the cathode [8], the output [2] is supplied to the cathode [7] and so forth, until finally the output [9] is supplied to the cathode [0]. The connections between terminals 22b and the Nixie tube for indicating the second figure, that is, the figure of 1 MHz are effected in a similar manner. For indicating the third figure, that is, the figure of 10 MHz, the collector output of transistor 21a is supplied to the cathode [7] of the respective Nixie tube and the collector output of transistor 21b is supplied to the cathode [8] of that Nixie tube.

The decimal outputs of the above mentioned binary-decimal decoder 20 are also supplied to a matrix decoder 24 (FIG. 1 and FIGS. 4A–4B) which is capable of igniting a given lamp of a panel display device 47, and also of forming the address signal for a memory means 59N.

As shown on FIG. 4A, outputs [0] and [1] relating to the figure of 100 KHz of the binary-decimal decoder section 20a are supplied to an OR gate consisting of a transistor 25a, the outputs [2] and [3] are supplied to the OR gate consisting of a transistor 25b, the outputs [4] and [5] are supplied to an OR gate consisting of a transistor 25c, the outputs [6] and [7] are supplied to an OR gate consisting of a transistor 25d, and the outputs [8] and [9] are supplied to an OR gate consisting of a transistor 25e. The outputs of these OR gates are obtained at terminals 26a, 26b, 26c, 26d and 26e, respectively, and also at terminals 27a, 27b, 27c, 27d and 27e, respectively, upon the occurrence of a signal supplied to a terminal 28. The outputs obtained at terminals 26a, 26b, ...26e represent address signals in the row direction of memory means 59N and the outputs obtained at terminals 27a, 27b,....27e represent driving signals in the row direction of the panel display device 47. As will be described later, the signal supplied to terminal 28 is the output of a flip-flop for controlling a station pulse generator during searching of the radio waves or read-out output of the memory.

Figure 5:
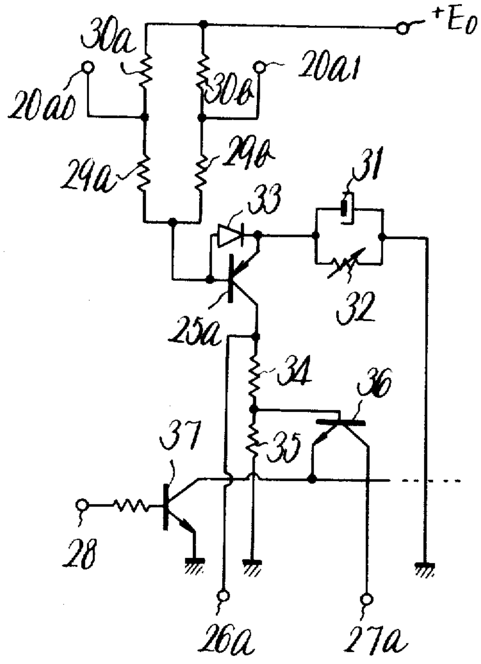
FIGS. 5 and 6 are detail circuit diagrams of parts of the circuit shown in FIGS. 4A and 4B.

The connections for the several OR gates are similar and for example, as shown on FIG. 5 for the OR gate consisting of the transistor 25a, the base of the transistor is connected through resistors 29a and 30a and also through resistors 29b and 30b connected in parallel with the resistors 29a and 30a to source terminal $+E_o$ which, for example, may be a 200V. D.C. source. The intermediate connection point between resistors 29a and 30a is connected to the terminal $20_{a0}$ of the binary-decimal decoder section 20a at which [0] of the first figure is obtained. The intermediate connection point between resistors 29b and 30b is connected to the terminal $20_{a1}$ of the binary-decimal decoder section 20a at which [1] is obtained. The emitter of transistor 25a is grounded through a circuit including a condenser 31 and variable resistor 32 connected in parallel. At the emitter there appears a direct current voltage, the value of which is equal to the quotient resulting from the division of 200V. by the values of the resistors 29a, 29b, 30a and 30b. The base of transistor 25a is also connected through a diode 33 conducting in the forward direction, to the emitter so as to give a direct current potential of +30V to the emitter. The collector of transistor 25a is connected to the terminal 26a at the memory side and also grounded through resistors 34 and 35, in series. The intermediate connection point between resistors 34 and 35 is connected to the base of an npn transistor 36 which has its collector connected to the respective terminal 27a at the panel display device side, and the emitter of transistor 36 is grounded through the collector-emitter path of a npn transistor 37. The base of transistor 37 is connected to terminal 28 to which are fed the outputs of the previously mentioned flip-flop for controlling the station pulse generator and the read out output of memory 59N.

With the arrangement shown in FIG. 5, if the output [0] of the binary-decimal decoder 20a is present, the potential at terminal $20_{a1}$ becomes OV. If these outputs [0] and [1] are absent, 70V. appears at each of the terminals $20_{a0}$ and $20_{a1}$. In this case, the base potential of transistor 25a becomes 70V and the emitter potential is 30V so that the transistor 25a becomes nonconductive, and as a result, no output appears at its collector. If the potential of only one of the terminals $20_{a0}$ and $20_{a1}$, for example, terminal $20_{a0}$, becomes 0V, the base potential of transistor 25a becomes lower than the emitter voltage of 30V resulting from the division by resistors 30b, 29b and 29a, for example, the base potential becomes 25V. Thus, transistor 25a becomes conductive and an output appears at the collector, that is, at the memory side terminal 26a. When transistor 25a becomes conductive, its base bias voltage is applied to transistor 36 and, if the transistor 37 is made conductive by a signal from terminal 28, transistor 36 also becomes conductive and hence an output appears at the panel display device side terminal 27a. These last mentioned outputs are taken out as pulse signals In the present example, the level of each output at the memory side terminal 26a is 30V and the level of each output at the panel display side terminal 27a is 0V.

As mentioned above, the OR gates composed of transistors 25b–25e have circuit arrangements similar to that described above with reference to the OR gate containing transistor 25a.

The outputs of the binary-decimal decoders 20b and 20c relating to the figures of 1 MHz and 10 MHz, respectively, are supplied to respective AND gates for producing the drive signals of the panel display device 47 in the column direction and the address signals of memory 59N. As shown in FIG. 4B, the AND gates are composed of 14 transistors 38a, 38b...38n and their outputs appear at memory side terminals 39a, 39b...39n and also at panel display side terminals 40a, 40b,...40n. The input signals to the AND gates composed of the above mentioned transistors 38a, 38b,...38n from the binary-decimal decoder sections 20b and 20c are arranged so that the outputs corresponding to 76 MHz and 89 MHz are obtained at terminals 39n...39a and at terminals 40n...40a, respectively. The foregoing is necessary, as the output from decoder section 20b, that is, the figure of 1 MHz is a complemental number with respect to the radio frequency. The outputs corresponding to 89 MHz may be obtained at the terminals 39a and 40a by supplying the output relating to [0] of binary-decimal decoder section 20b and the output relating to [8] obtained from the collector of transistor 21b of binary-decimal decoder section 20c to the AND gate consisting of transistor 38a. In a similar manner, the outputs corresponding to 88 MHz, 87MHz,...76 MHz may be obtained at terminals 39b...39n and at terminals 40b...40n, respectively, by suitably supplying the outputs of the binary-decimal decoders 20b and 20c to the AND gates consisting of the transistors 38b, 38i c,...38n, respectively.

Figure 6:
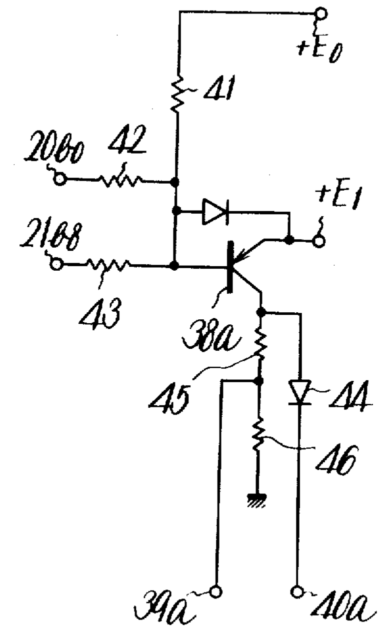

As shown particularly in FIG. 6, the base of transistor 38a is connected through a resistor 41 to the 200V source terminal $+E_0$ and is also connected through a resistor 42 to the output terminal $\mathbf{20}_{b0}$ relating to [0] of the binary-decimal decoder section 20b. The base of transistor 38a is further connected through a resistor 43, whose resistance is equal to that of resistor 42, to the output terminal $\mathbf{21}_{b8}$ relating to [8] of the binary decoder section 20b. The emitter of transistor 38a is connected to the 100V source terminal $+E_1$ and is also connected through a diode to the base. The collector of transistor 38a is tapped out and connected through a diode 44 to panel display side terminal 40a and is also grounded through series connected resistors 45 and 46. An intermediate connection point between resistors 45 and 46 is also tapped out and connected to memory side terminal 39a.

With the circuit arrangement shown in FIG. 6, if the content relating to 1 MHz in station select counter 14 is [0], the potential at output terminal $\mathbf{20}_{b0}$ of binary-decimal decoder section 20b becomes 0V and if the above content is not [0], the potential at output terminal $\mathbf{20}_{b0}$ becomes 70V. If the content relating to 10 MHz in the station select counter is [8], the potential at output terminal $\mathbf{21}_{b8}$ becomes 0V, and if the above content is not [8], the potential at output terminal $\mathbf{21}_{b8}$ becomes 70V. Thus, the resistance values of resistors 41,42 and 43 may be suitably selected so that, only when the terminals $\mathbf{20}_{b0}$ and $\mathbf{21}_{b8}$ are at 0V, the base potential of transistor 38a becomes sufficiently lower than the emitter potential, that is, 100V lower, and, as a result, transistor 38a becomes conductive and output pulses are obtained from memory side terminal 39a and panel display side terminal 40a. In the present example, these output pulses have levels of 5V, at memory side terminal 39a, and of 100V, at panel display side terminal 40 a.

The AND gates consisting of transistors 38b...38n may be constructed in the same manner as described above with reference to the AND gate consisting of transistor 38a.

The panel display device 47 to be controlled by the signals from matrix decoder 24 will now be described in detail with reference to FIG. 7 where such device is shown to comprise a substrate on which seventy indicator elements, for example, neon lamps $L_1$, $L_2$, $L_3$,...$L_{69}$, $L_{70}$, are arranged in five rows and 14 columns. It will be seen that the number of these lamps is equal to the number of the divided frequency ranges. The panel display device 47 has indications of 76 MHz to 89 MHz on its respective columns and indications of $\genfrac{}{}{0pt}{}{0\ 2\ 4}{1,3,5}\ldots\genfrac{}{}{0pt}{}{8}{9}$ spaced by 200 KHz from each other on its respective rows. In the FM channel plan used in Japan, the stations are spaced apart by 100 KHz. The adjacent stations which are spaced from each other by 100 KHz are subjected to the capture effect so as to suppress the broadcast waves radiated from the weather station, and, as a result, it becomes impossible to separately receive the broadcast waves radiated from the two stations with adjacent frequencies. Thus, it is necessary and sufficient to arrange the lamps $L_1$...$L_{70}$ so that they are spaced apart by 200 KHz in order to bring each station into correspondence with a respective lamp.

Figure 8:
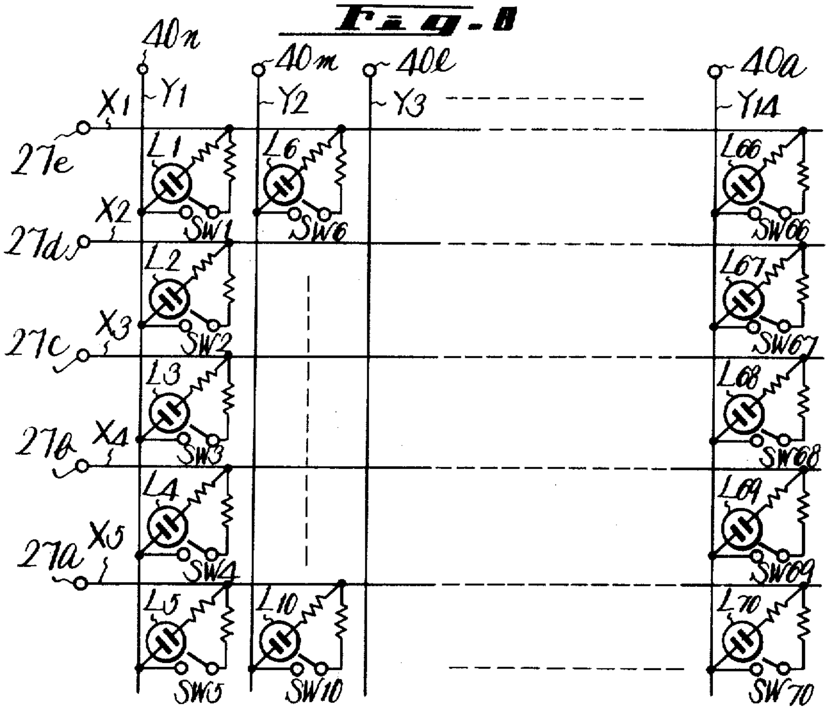
FIG. 8 is a circuit diagram of the panel display device.

As shown in FIG. 8, the panel display device 47 further comprises five row lines $X_1$, $X_2$, $X_3$, $X_4$ and $X_5$ and 14 column lines $Y_1$, $Y_2$,.....$Y_{14}$. At the cross-over point between each row line and each column line, a respective one of neon lamps $L_1$, $L_2$,....$L_{70}$ and a resistor connected in series therewith are connected between the respective crossing row and column lines. Push type switches $SW_1$, $SW_2$,.....$SW_{70}$ and resistors connected in series therewith are connected in parallel with the series circuits of the lamps $L_1$...$L_{70}$ and associated resistors. The row lines $X_1$, $X_2$,....$X_5$ are connected to panel display side terminals 27a, 27b,....27e, respectively, from which are obtained the row direction drive signals of matrix decoder 24. The column lines $Y_1$, $Y_2$,....$Y_{14}$ are respectively connected to panel display side terminals 40a,40b,....40n from which are obtained the column direction drive signals of matrix decoder 24. As described above, these drive signals are generated so as to have the relation of complementary numbers with respect to the corresponding radio frequencies so that row line $X_1$ is connected to terminal 27e, row line $X_2$ is connected to terminal 27d, row line $X_3$ is connected to terminal 27c, row line $X_4$ is connected to terminal 27b, and row line $X_5$ is connected to terminal 27a. Similarly, column lines $Y_1$, $Y_2$,....$Y_{14}$ are respectively connected to terminals $\mathbf{40}_n$, 40m,...40a. As described above each row direction drive signal from matrix decoder 24 is a pulse signal of ground potential, and each column direction drive signal is a 100V pulse signal. For example, if the output [138] corresponding to the binary output of station select counter 14 is obtained from binary-decimal decoder 20 and, at such time, the output of a flip-flop for controlling the pulse generator or the output of the memory is [1], then terminal 27*e* is at ground potential and the potential of terminal 40*n* is 100V to ignite neon lamp $L_1$, whereby panel display device 47 indicates that the station broadcasting with the frequency of 76.0 MHz or 76.1 MHz is selected. In another example, if the output [009] corresponding to the binary output of station select counter 14 is obtained from binary-decimal decoder 20 and the output of the flip-flop for controlling the pulse generator or the output of the memory is present, terminal 27*e* is grounded and the potential of terminal 40a is 100V to ignite neon lamp $L_{66}$, whereby panel display device 47 indicates that the station broadcasting with the frequency signal of 89.0 MHz or 89.1 MHz is selected. Thus, if the station select pulse is supplied from, for example, the terminal 18 to station select counter 14, the neon lamps are ignited successively in the order of descending frequencies, that is, in the order of $L_{70}$, $L_{69}$,...$L_1$. This is the so-called time divisional drive method.

The switches $SW_1$, $SW_2$,.....$SW_{70}$ connected in parallel with neon lamps $L_1$, $L_2$,....$L_{70}$ are in the form of conventional socalled lamp switches. That is, neon lamps $L_1$, $L_2$,....$L_{70}$ of panel display device 47 are housed in glass or other transparent casings which can be pressed or depressed to close the respective switches. The mechanical details of these switches are well known and thus are not described herein. When a lamp switch is closed or turned "on", that fact is detected by a station select circuit 48 (FIGS. 1 and 9).

Figure 9:
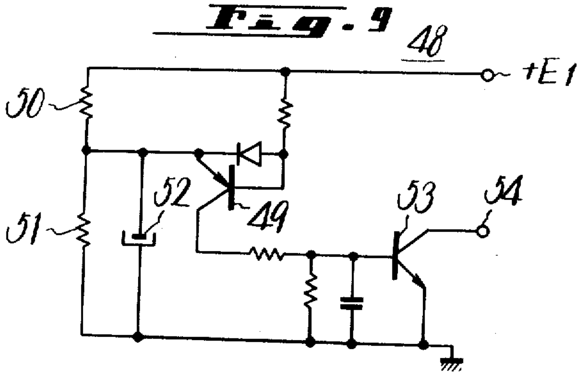
FIG. 9 is a circuit diagram of the station select detector included in the diagram of FIG. 1.

In FIG. 9, $+E_1$ represents the 100V source terminal for the matrix decoder 24 in FIGS. 4 and 6. THe source terminal $+E_1$ is connected through a resistor to the base of a pnp transistor 49 and is grounded through resistors 50 and 51 whose intermediate connection point is grounded through a condenser 52 and is connected to the emitter of the transistor 49. The collector of transistor 49 is connected through a resistor to the base of an npn transistor 53 whose emitter is grounded and the collector of which is connected to a detecting terminal 54.

When the neon lamps are ignited in succession, if switch $SW_{66}$, for example, is closed, at the time when the signals from matrix decoder 24 would cause ignition of the respective lamp $L_{66}$, terminal 27*e* is grounded and the voltage of 100V is supplied from source terminal $+E_1$, through the collector-emitter of transistor 38*a* and the related diode to terminal 40*a*, as shown on FIG. 4B. At this instant, the load between the row line $X_1$ and the column line $Y_{14}$ is larger than it would be if switch $SW_{66}$ were not closed (that is, if the load were only the neon lamp $L_{66}$ and the resistor connected in series therewith) to rapidly decrease the potential at the source terminal $+E_1$. It should be noted that the source circuit feeding terminal $+E_1$ is not provided with a constant voltage feature for the purpose of ensuring that 100V direct current voltage obtained at terminal $+E_1$ at all times, and therefore voltage regulation of the source circuit is not good. When the potential at source terminal $+E_1$ is suddently decreased as described above, the base potential of transistor 49 is also decreased. Since the emitter potential of transistor 49 is constant for a short time owing to the charge of condenser 52, transistor 49 becomes conductive and hence transistor 53 also becomes conductive to change the detecting terminal 54 from the open condition to the grounded condition, and as a result, the closed state of switch $SW_{66}$ can be detected. Similarly, when any of the other switches are closed, the closed state of these switches can be detected. The detection output from terminal 54 is supplied to a control circuit for a "scan" mode of operation to be described later.

Figure 10:
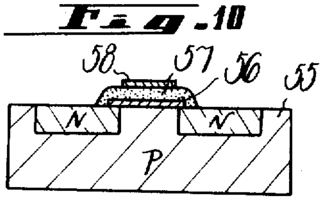
FIG. 10 is a detail sectional view of a non-voltaic memory element that may be included in a memory provided in the broadcast receiver according to the invention.
Figure 11:
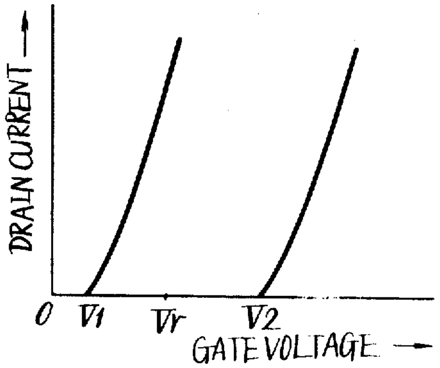
FIG. 11 shows characteristic curves of the memory element of FIG. 10.

The memory unit which is addressed by the signals relating to the row and column directions from the above described matrix decoder 24 will now be described. The memory unit consists of a memory 59N composed of memory elements $Q_1$...$Q_{70}$ (FIG. 12) and a memory control circuit 63 (FIG. 13) for controlling the memory 59N. In the present example, non-voltaic memory elements are used in the memory 59N. As an example of a suitable non-voltaic memory element, mention may be made of a field effect element, for example, a MAOS element, having a gate constructed of multi-layered insulation films for shifting the threshold voltage before and after the voltage is applied to the gate. As shown on FIG. 10, an MAOS element comprises a silicon substrate 55 with a silicon oxide film 56, an aluminum oxide film 57 and an aluminum gate electrode 58 disposed, in the order mentioned, on the substrate 55. With such MAOS element, the drain current begins to flow from the first threshold voltage $V_1$ at the gate voltage of, for example, 2V, and if the critical voltage, for example, a voltage higher than 22V, is applied to the gate electrode the threshold voltage is shifted. This phenomenon occurs at both positive and negative critical voltages. That is, if the gate voltage is increased to values higher than the positive critical voltage, the threshold voltage is gradually shifted in the positive direction, while if the gate voltage is increased to values higher than the negative critical voltage, the threshold voltage is gradually shifted in the negative direction. The second threshold voltage $V_2$ shown in FIG. 11 is the threshold voltage produced when the positive voltage of 30V, which is higher than the critical voltage, is applied to the gate electrode. When the threshold voltage is shifted as above described, it is not changed even when the voltage applied to the gate electrode is removed. The second threshold voltage $V_2$ may be restored to the first threshold voltage $V_1$ by applying a voltage higher than the negative critical voltage, for example, a voltage of −45V, to the gate electrode. If the voltage $Vr$ which is substantially intermediate the first threshold voltage $V_1$ and the second threshold voltage $V_2$ of the MAOS element, for example, a voltage of 10V, is applied to the gate electrode, it is possible to ascertain the condition of the MAOS element by the presence or absence of the drain current. If this voltage $Vr$ (10V) is used as the read out voltage, the first threshold voltage $V_1$ and the second threshold voltage $V_2$ can be the conditions corresponding to [0] and [1], respectively. The voltage (+30V) higher than the positive critical voltage in order to obtain this condition [1] may be used as the write voltage, and the voltage (−45V) higher than the negative critical voltage in order to restore the MAOS element to the condition [0] may be used as the erase voltage, and therefore, the MAOS element may be used as an erasable memory element.

Figure 12:
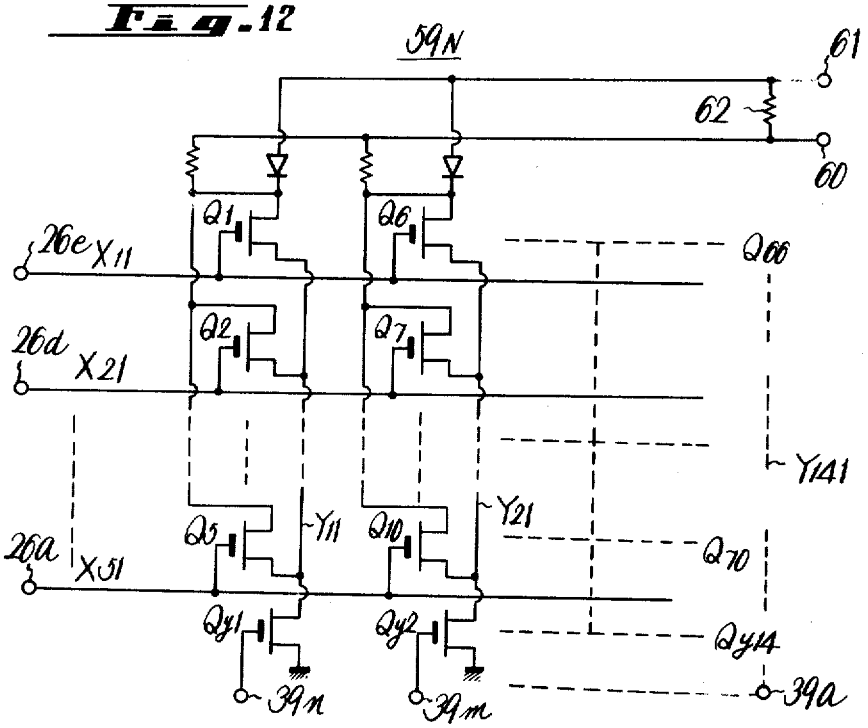
FIG. 12 is a circuit diagram of a memory made up of the memory elements of FIG. 10 arranged to form a matrix.

As shown on FIG. 12, 70 of the MAOS elements, each having the above mentioned characteristic, are arranged in a matrix formed by five rows and 14 columns to provide the 70 bits memory 59N. More specifically, the 70 MAOS elements $Q_1$, $Q_2$,....$Q_{70}$ are shown to be associated with five row lines $X_{11}$, $X_{21}$,....$X_{51}$ and with 14 column lines $Y_{11}$, $Y_{21}$,....$Y_{141}$. To the row line $X_{11}$ are connected the gate electrodes of the MAOS memory elements $Q_1$, $Q_6$, $Q_{11}$,....$Q_{66}$ in the first row. Similarly, the gate electrodes of other MAOS elements are connected, at every column of the second, third, fourth and fifth rows to the row lines $X_{21}$, $X_{31}$, $X_{41}$ and $X_{51}$, respectively. To the column line $Y_{11}$ are connected the source electrodes of the MAOS memory elements $Q_1$, $Q_2$,....$Q_5$ in the first column. Similarly, the source electrodes of the other MAOS elements are connected to the column lines $Y_{21}$, $Y_{31}$,....$Y_{141}$ at every row of the second to the 14th columns, respectively. The column lines $Y_{11}$, $Y_{21}$, ....$Y_{141}$ are grounded, at one end, through the drain and source electrodes of FET $Q_{Y1}$, $Q_{Y2}$,...$Q_{Y14}$, respectively. The gate electrodes of FET $Q_{Y1}$, $Q_{Y2}$,...-.$Q_{Y14}$ are connected to memory side terminals 39*n*,39*m*....39*a* relating to the column direction of matrix decoder 24 for obtaining the pulse signal of +5V from the respective terminals. The MAOS elements arranged in each column, that is, ($Q_1$, $Q_2$, ....$Q_5$),($Q_6$,$Q_7$....$Q_{10}$).... ($Q_{66}$, $Q_{67}$,....$Q_{70}$ ) have their drain electrodes connected to each other and further connected to a source terminal 60 to which is applied, through load resistors, the direct current voltage of, for example, +24V. The connected together drain electrodes are also connected to the read out terminal 61 through the cathode and anode of a diode associated with each column. A resistor 62 is connected between read out terminal 61 and source terminal 60.

The row lines $X_{11}$, $X_{21}$,....$X_{51}$ are supplied with the pulse signals formed at the terminals 26*e*,26*d*...26*a* of matrix decoder 24 and the column lines $Y_{11}$, $Y_{21}$,....$Y_{141}$ are supplied with pulse signals formed at the terminals 39*n*,39*m*....39*a*, respectively, of matrix decoder 24 so as to effect scanning in row and column directions, and as a result, the address is specified. When the level of the pulse signals supplied to row lines $X_{11}$, $X_{21}$,....$X_{51}$ is changed, write, read out and erasure of each memory element may be effected. For example, if a pulse signal of a voltage higher than the critical voltage, for example, 30V, is supplied from terminal 26*e* to the row line $X_{11}$, and a pulse signal of 5V is supplied from terminal 39*n*, FET $Q_{Y1}$ becomes conductive to connect the source of MAOS element $Q_1$ to ground, and, as a result, the threshold voltage of the MAOS element $Q_1$ is shifted from $V_1$ to $V_2$ in FIG. 11, thereby writing [1]in MAOS element $Q_1$. If a pulse signal of the read out voltage, for example, 10V, is then supplied to row line $X_{11}$, since the MAOS element $Q_1$ has [1]written therein, the drain current doesn't flow and the read out terminal 61 receives the source potential. Conversely, if the condition of the MAOS element $Q_1$ indicates [0], the drain current flows and read out terminal 61 is at ground potential, whereby the read out is effected. If the pulse signal of the voltage (−45V) higher than the negative critical voltage is supplied to the row line $X_{11}$, all of the MAOS elements $Q_1$, $Q_6$, ...$Q_{66}$ in that first row line are not erased irrespective of whether or not the positive pulse signal is supplied from column line $Y_{11}$ to bring these elements into the condition [0]. Since the voltage of 24V is supplied from the source terminal 60, even if the write voltage is supplied to the gate electrode of MAOS element $Q_1$ when the FET $Q_{Y1}$ is nonconductive, the writing is not effected at MAOS element $Q_1$.

It will be seen that, in the above described memory 59N, the pulse signals supplied to the row lines $X_{11}$, $X_{21}$,...$X_{51}$ and column lines $Y_{11}$, $Y_{21}$,....$Y_{141}$ are signals for specifying the address in the row and column directions, while the levels of the signals supplied to the row lines $X_{11}$, $X_{21}$,....$X_{51}$ are changed to achieve the write, erase and read out functions. Thus, the memory 59N has duplex operations to perform and its control circuit may become complex in construction. In the present embodiment, therefore, a preferred memory control circuit 63 (FIG. 13) is provided for the purpose of simplifying the construction of the memory unit as a whole.

Figure 13:
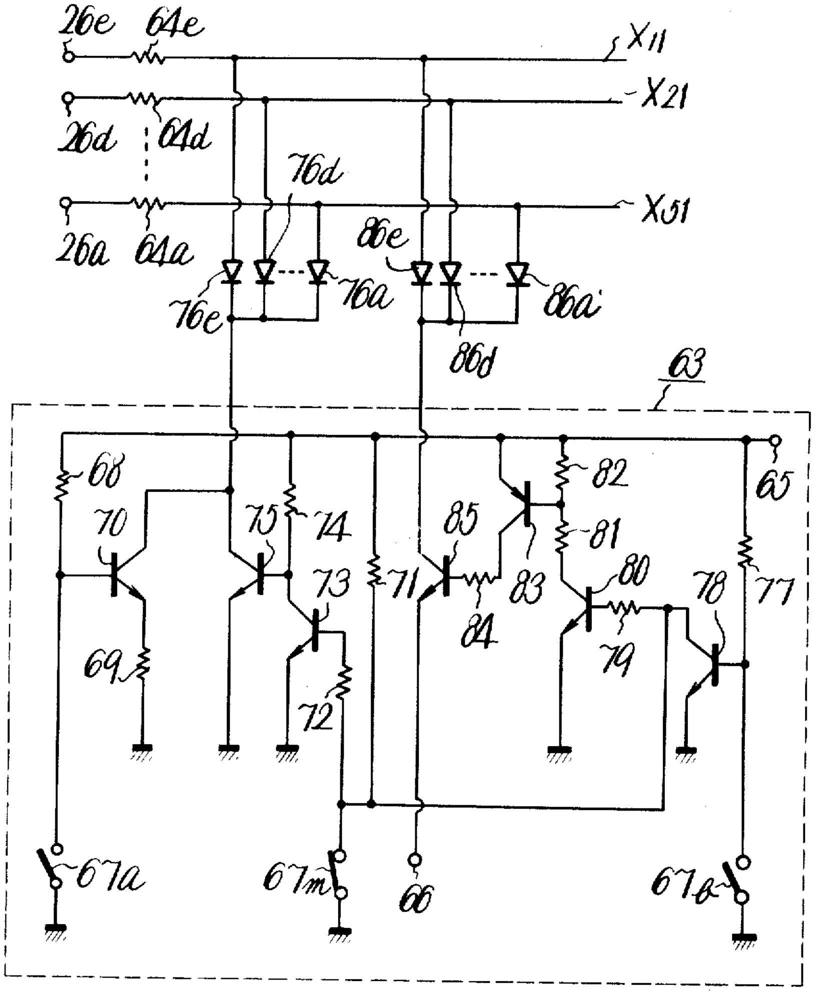
FIG. 13 is a diagram of a memory control circuit for controlling the memory shown in FIG. 12.

As shown in FIG. 13, the row lines $X_{11}$, $X_{21}$,....$X_{51}$ of the above mentioned memory 59N are extended and connected through resistors 64*e*,64*d*,....64*a* to row direction memory side terminals 26*e*,26*d*,....26*a* of matrix decoder 24. From these memory side terminals 26*e*,26*d*,....26*a* are obtained the pulse signals at the write level of the successive MAOS elements, that is, pulse signals of 30V, as described above. The memory control circuit 63 is provided with a source terminal 65 adapted to be supplied with a positive source voltage, for example, +5V, an erase voltage supply terminal 66 adapted to be supplied with an erase voltage higher than the negative critical voltage (−45V), switches 67*a* and 67*b* for supplying write and read out instructions, respectively, a memory select switch 67*m*, and a plurality of switching transistors. It will be noted that, in practice, switches 67*a*,67*b* and 67*m* may be replaced by pulse signals at ground level. In FIG. 1, memory control circuit 63 is not shown apart from memory 59N and is to be considered as being incorporated in the block representing the latter. The memory select switch 67*m* is adpated to select a memory 59P which is similar to the memory 59N shown in FIG. 12. The switch 67*m* has its movable contact grounded and is closed when the memory 59N is not to be operated.

The movable contacts of the switches 67*a* and 67*b* are also grounded and the fixed contact of the switch 67*a* is connected through a resistor 68 to source terminal 67 and also connected to the base of an npn transistor 70 whose emitter is grounded through a resistor 69. The fixed contact of memory select switch 67*m* is connected through a resistor 71 to source terminal 65 and through a resistor 72 to the base of an npn transistor 73 whose emitter is grounded. The collector of transistor 73 is connected through a resistor 74 to source terminal 65 and to the base of an npn transistor 75 whose emitter is grounded. The collector of transistor 75 and the collector of transistor 70 are connected to each other and the common connection point is connected through the cathode-anode paths of parallel connected diodes 76*e*,76*d*....76*a* to row lines $X_{11}$, $X_{21}$,....$X_{51}$, respectively. The fixed contact of switch 67*b* is connected through a resistor 77 to source terminal 65 and also connected to the base of an npn transistor 78 whose emitter is grounded. The collector of transistor 78 is connected to the fixed contact of memory select switch 67*m* and also connected through a resistor 79 to the base of an npn transistor 80 whose emitter is grounded. The collector of transistor 80 is connected through resistors 81 and 82, in series, to source terminal 65 and a connection point intermediate resistors 81 and 82 is connected to the base of a pnp transistor 83 whose emitter is connected to source terminal 65. The collector of transistor 83 is connected through a resistor 84 to the base of an npn transistor 85 whose emitter is connected to erase voltage supply terminal 66 and the collector of transistor 85 is connected through the cathode-anode paths of diodes 86*e*,86*d*....86*a* to the row lines $X_{11}$, $X_{21}$,....$X_{51}$, respectively.

With the above described arrangement of memory control circuit 63, when memory select switch 67*m* is closed, transistor 75 becomes conductive to ensure the row lines $X_{11}$, $X_{21}$,....$X_{51}$ are at ground potential irrespective of the positions of switches 67*a* and 67*b*, and, as a result, the memory 59N does not operate. If memory select switch 67*m* is opened and switches 67*a* and 67*b* are also opened, transistors 73,70 and 78 become conductive and the pulse signal supplied to, for example, the terminal 26*e* is divided by resistors 64*e* and 69 and obtains a crest value which is then supplied to the row line $X_{11}$. The values of the resistors 64e and 69 are suitably selected so that the pulse signal applied to row line $X_{11}$ has a level corresponding to the read out voltage V*r*, for example, 10V. Similarly, pulse signals may be supplied to the other row lines $X_{21}$,....$X_{51}$. If memory select switch 67*m* and switch 67*a* are opened and switch 67*b* is closed, transistors 70,80,83 and 85 become conductive to connect row lines $X_{11}$, $X_{21}$,....$X_{51}$ through diodes 86*e*,86*d*,....86*a* to erase voltage supply terminal 66. Thus, the erase voltage is supplied to all of the row lines $X_{11}$, $X_{21}$,....$X_{51}$ and all of the memory elements $Q_1$–$Q_{70}$ are thereby erased. If memory select switch 67*m* and switch 67*b* are opened and switch 67*a* is closed, the transistors other than transistors 73 and 78 become nonconductive and the pulse signals appearing at terminals 26*e*,26*d*....26*a* and having the write level are directly supplied to row lines $X_{11}$, $X_{21}$,....$X_{51}$ and written into the respective memory elements of memory 59N.

Figure 15:
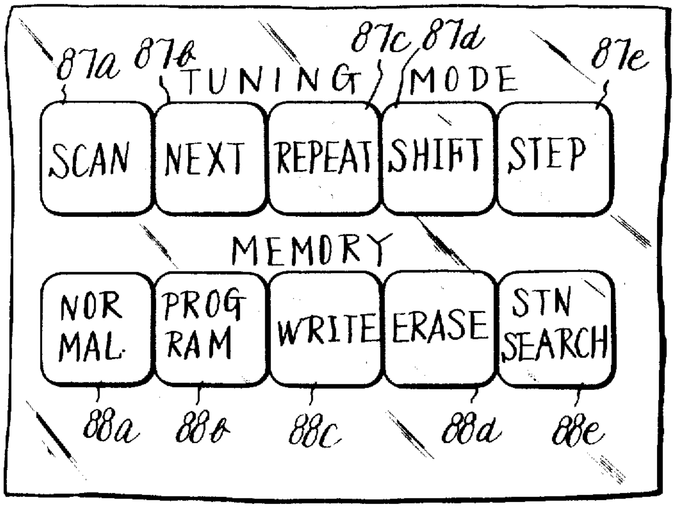
FIG. 15 is an enlarged partial elevational view of the control panel included in the receiver of FIG. 14.

The broadcast receiver according to this invention is provided with a control circuit CTL (FIG. 1) for controlling the tuning operations of the receiver and the operations of panel display device 47 and memory 59N. As shown on FIG. 14, such control circuit may be controlled by the selective manual actuation of ten buttons 87*a*, 87*b*,87*c*,87*d*,87*e*,88*a*,88*b*,88*c*,88*d* and 88*e* which are arranged on the face of the receiver case. Each of these buttons is of a type that contains a light source and that closes a related control switch when the button is depressed. Each of the buttons is electrically locked in its depressed position, for example, by means of the output of a flip-flop, as hereinafter described. Further, the functions controlled by the various buttons are indicated by suitable indicia thereon, as shown on FIG. 15. The buttons 87*a*,87*b*....87*e* are provided for selecting and indicating the various modes of tuning operation of the receiver, while the buttons 88*a*,88*b* ....88*e* are provided for selecting and indicating the various modes of tuning operation of the receiver, while the buttons 88*a*, 88*b*....88*e*are provided for selecting and indicating the various modes of operation of the memory. The face of the receiver case further has a source switch 89 thereon which, when closed, causes buttons 87*a* and 88*a* to be illuminated.

The button 88*e* is provided specifically for selecting a so-called "station search" mode of operation. When button 88*e* is depressed, after the receiver antenna has been set, the light associated with button 87*a* is extinguished, and button 88*e* is illuminated to indicate that the station-search mode has been selected. During the station-search mode, the lamps $L_{70}$...$L_1$ of display panel device 47 are illuminated in succession in the order of descending frequencies to indicate that the FM band is being scanned over its full range of frequencies, which scanning is completed in a relatively short time, for example, on the order of 10 seconds. During such scanning of the FM band, any FM broadcasting station providing a signal at the location of the receiver that is higher than the muting level is written or recorded in the respective memory element of memory 59N. Upon the completion of the station-search mode, if one or more receivable stations are written or recorded in memory 59N, button 88*e* is extinguished and button 87*a* is again illuminated to initiate a so-called scan mode of operation during which memory 59N is read-out to cause the flashing of those lamps on panel display device 47 which correspond to the broadcast stations providing signals that can be received at the location of the receiver.

Figure 16:
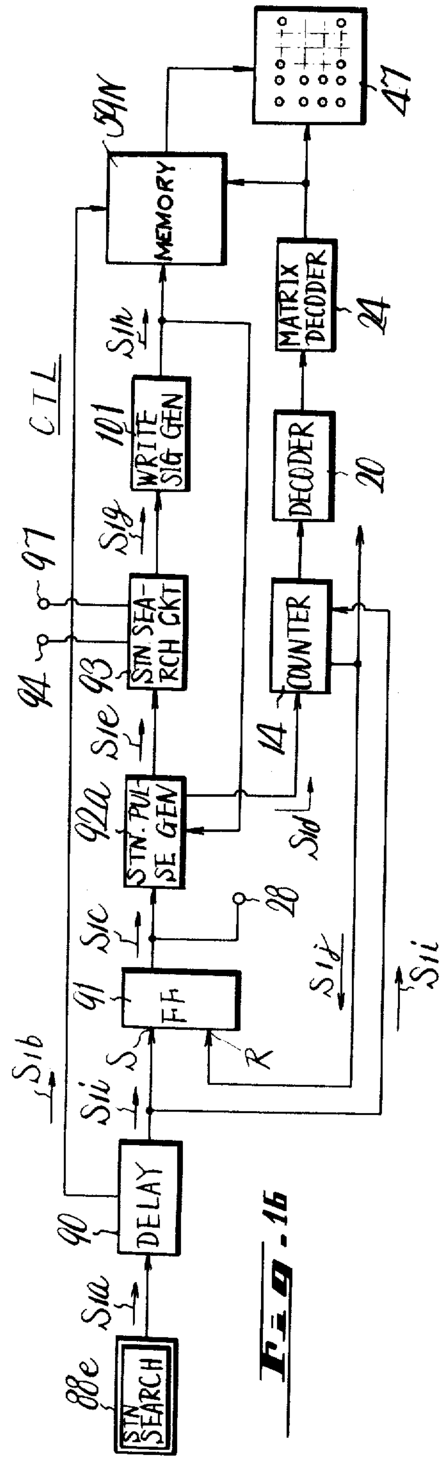
FIG. 16 is a block diagram of a station search circuit for searching the radio waves broadcast by the various stations.
Figures 17A, 17B, 17C, 17D, 17E, 17F, 17G, 17H, 17I, 17J:
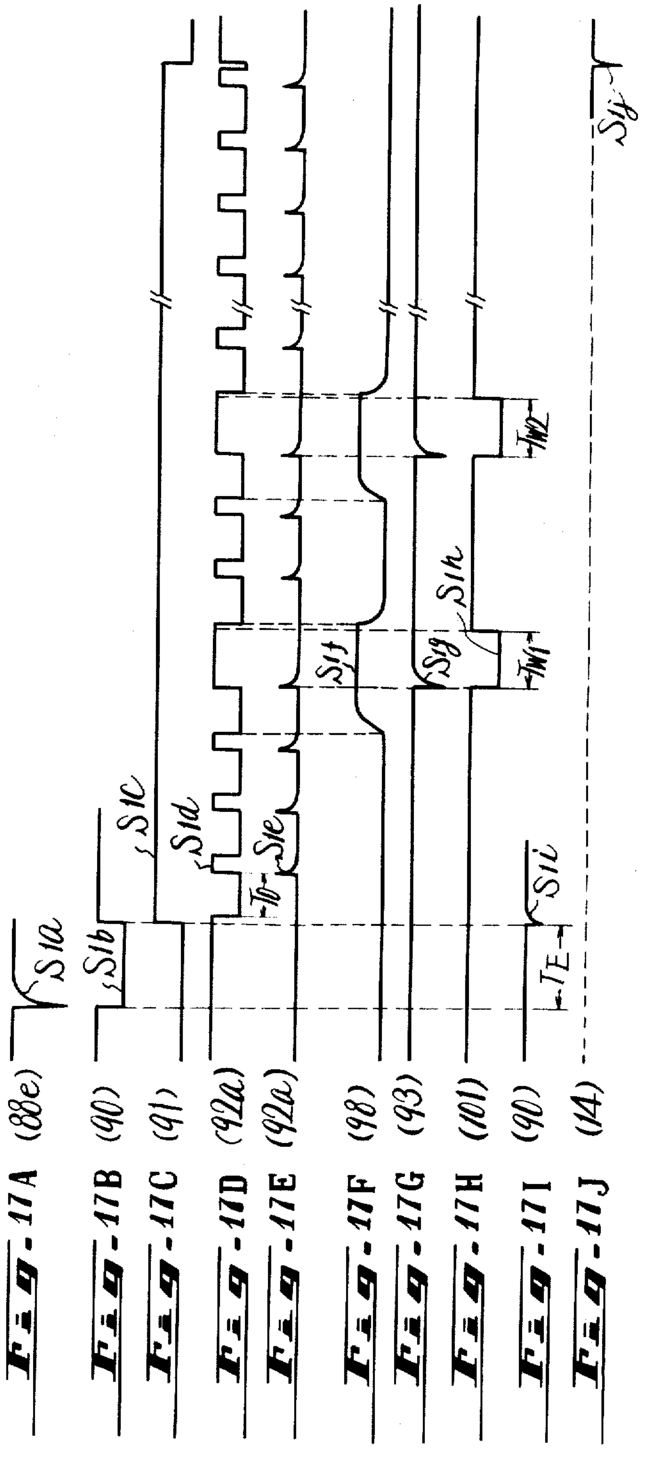
FIGS. 17A to 17J show wave forms for explaining the operation of the station search circuit of FIG. 16.

Referring now to FIG. 16, it will be seen that a control circuit for the above station-search mode of operation includes a delay circuit 90 consisting of a monostable multivibrator triggered by a trigger pulse $S_{1a}$ (FIG. 17A) which is generated when button 88*e* is pushed or actuated. Thus, delay circuit 90 produces a pulse signal $S_{1b}$ (FIG. 17B) of a width TE of, for example, 300 ms, and which is adapted to serve as an instruction signal for closing siwtch 67*b* of memory control circuit 63 (FIG. 13). Upon such closing of switch 67*b*, one of the memory elements in memory 59N is erased at the time TE and the rising up characteristic of circuit 90 causes generation of a trigger pulse $S_{1i}$ (FIG. 17*I*). The trigger pulse $S_{1i}$ is supplied to outside reset terminal 18 (FIG. 2) of station select counter 14 so as to reset the content of the latter. The trigger signal $S_{1i}$ is adapted to set a flip-flop 91. If the output signal $S_{1c}$ of flip-flop 91 becomes [1], as shown in FIG. 17C, a station pulse generator 92*a* begins to oscillate and generates an output signal $S_{1d}$ (FIG. 17D). The output signal $S_{1c}$ of flip-flop 91 is also supplied to terminal 28 of matrix decoder 24 (FIG. 4A) so as to make transistor 37 conductive in the station-search mode. The station pulse generator 92*a* may be formed of transistors constituting a non-stable multivibrator, with one of such transistors being conductive when the output of flip-flop 91 is [0]and nonconductive when the output of flip-flop 91 is [1]. The [0] and [1] levels of the output signal $S_{1d}$ of station pulse generator 92*a* are as shown in FIG. 17D so that its down part triggers station select counter 14 so as to start its operation. The rising up part of signal $S_{1d}$ permits the station search pulse $S_{1e}$ (FIG. 17E) to be generated and supplied to a station search circuit 93. From the time of triggering the station select counter 14 up to the time of generating station search pulse $S_{1e}$, there is a lapse of time T*o*, for example 50 ms. It will be noted that the time difference T*o* is determined by taking into consideration the stabilizing time of the phase locked loop of the receiver and the response time of station search circuit 93.

Figures 18, 19A, 19B, 19C, 19D, 19E, 20A, 20B, 20C, 20D, 20E:
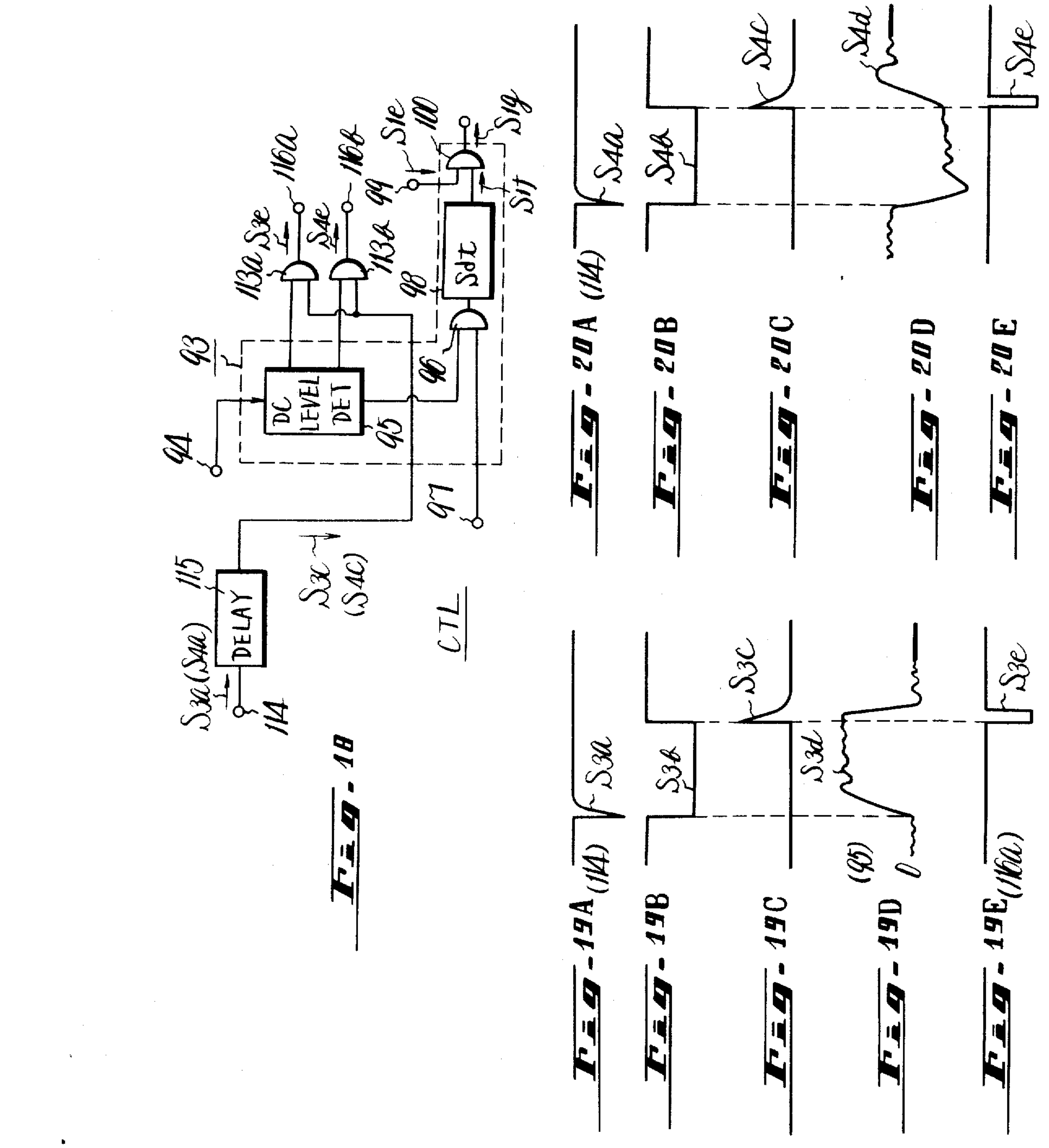
FIG. 18 is a detail block diagram of certain components included in the station search circuit of FIG. 16.
FIGS. 19A to 19E and FIGS. 20A to 20E show waveforms to which reference will be made in explaining the operation of the components shown in FIG. 18.

The S curve demodulating output of FM discriminator 3 (FIG. 1) is supplied to a terminal 94 of station search circuit 93 which, as shown on FIG. 18, is provided with a DC level detector 95, for example, in the form of a differential amplifier, for detecting the direct current level of the demodulating output. The zero level detecting output of DC level detector 95 and the muting control signal obtained at a terminal 97 by rectifying the output of intermediate frequency amplifier 2 (FIG. 1) are supplied to an AND gate 96. The output of AND gate 96 is integrated in an integration circuit 98 and the output of the latter together with the above mentioned station search pulse $S_{1e}$ (FIG. 17E) supplied to a terminal 99 are supplied to an AND gate 100. With the foregoing construction, the demodulating output supplied to terminal 94 is at zero level at the time of tuning the receiver and is detected by DC level detector 95 which generates an output signal of a predetermined level. The intermediate frequency signal of 10.7 MHz is present at the output of the intermediate frequency amplifier 2 so that the muting control signal applied to terminal 97 becomes [ 1 ]and, as a result, a station signal indicating that the receiver is tuned with the station corresponding to the content of station select counter 14 is obtained at the output terminal of AND gate 96. The rising up and down characteristics of this station signal are slowed down in the integration circuit 98 for supplying the gate signal $S_{1f}$ shown in FIG. 17F to AND gate 100. When AND gate 100 is supplied with gate signal $S_{1f}$, the occurrence of station search pulse $S_{1f}$ causes the trigger signal $S_{1g}$ shown in FIG. 17G to be obtained at the output of AND gate 100. Thus, the trigger signal $S_{1g}$ obtained from station search circuit 93 can trigger a write signal generator 101 (FIG. 16) consisting of a mono-stable multivibrator whose delay time $T_W$ is, for example, 150 ms., thereby forming a write signal $S_{1h}$ (FIG. 17H). The write signal $S_{1h}$ is an instruction signal which serves to close switch 67*a* of memory control signal 63 (FIG. 13). As a result, the output signal of matrix decoder 24 is supplied to memory 59N so as to write therein. At the same time this write signal is fed back to station pulse generator 92*a* (FIG. 16) to stop its oscillating operation during the period when the write signal is generated. The address at which the writing in memory 59N occurs is determined by the address specifying signal formed by the above mentioned binary-decimal decoder 20 and matrix decoder 24. In the panel display device 47, the drive signal formed at the matrix decoder 24 causes the neon lamps $L_{70}$...$L_1$ to ignite in succession in the order of descending frequencies. It will be apaprent that the memory read out output given to terminal 28 (FIG. 4) of matrix decoder 24 is [ 0] during the period of station-searching mode of operation. Thus, the transistors 38*a*...38*n* are not made conductive by the memory read out output, but are set by the output of flip-flop 91, and as a result, the neon lamps $L_{70}$...$L_1$ are ignited in succession even when the memory read out output is [0].

As stated hereinbefore, whenever the receiver is in the tuned condition, that is, when the frequency of the local oscillator in front end 1 corresponds to the frequency of a radio wave being received by antenna AT, the oscillation of station pulse generator 92*a* is momentarily stopped so that the lamp of panel display device 47 which corresponds to the tuned radio frequency is ignited for a longer period. Thus, the content of the station select counter 14 from [000] to [139] searches the possible broadcasting stations in succession. When a signal from a station is present, the presence of such station is recorded or written in memory 59N in succession in the time period $T_{W1}$, $T_{W2}$,.... When the scanning throughout the total radio frequency range of the FM band is completed, that is, when station select counter 14 is shifted from 139] to [140], the inside reset signal $S_{1j}$ (FIG. 17J) is generated as described above. The inside reset signal causes station select counter 14 to reset to [000] and also causes flip-flop 91 to reset, and hence the oscillation of station pulse generator 92*a* is halted. The inside reset signal is also applied as a start signal to a control circuit for the scan mode to be described in detail hereinafter.

As mentioned previously, the scan mode of operation serves to indicate, by ignition of the corresponding lamps of panel display device 47, those broadcast stations which can be received by the receiver at the particular location of the latter. Such scan mode is initiated automatically upon the completion of the previously described station-search mode or, alternatively, in response to depressing of the button 87a.

Figure 21:
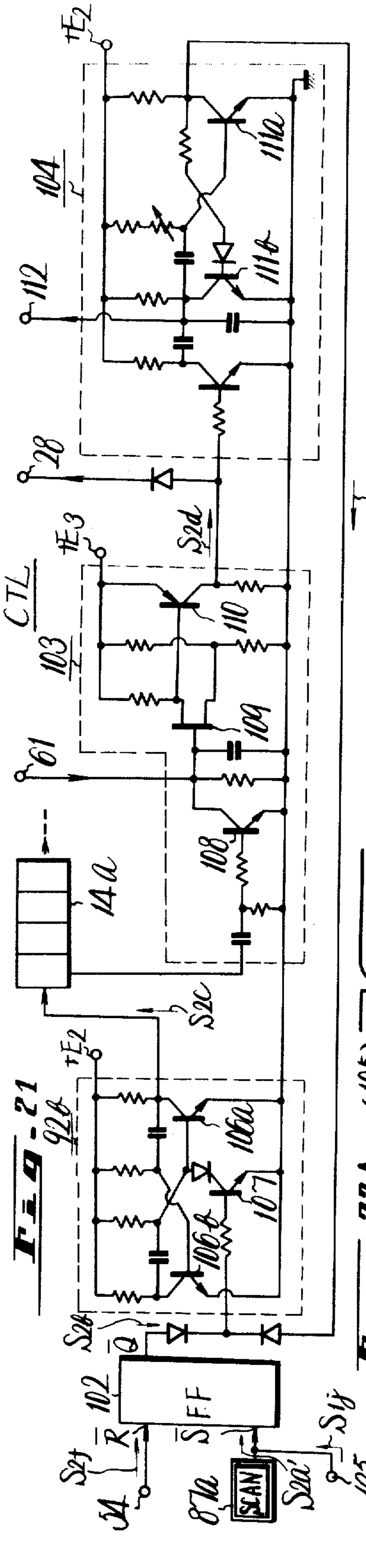
FIG. 21 is a circuit diagram of a circuit provided for energizing the panel display device by means of the signal read out of the memory.

The control circuit for the scan mode is included in the control circuit CTL of FIG. 1 and, as shown on FIG. 21, generally comprises a flip-flop 102, a station pulse generator 92*b*, a memory output discriminator 103, a memory output delay circuit 104 and voltage source terminals $+E_2$ and $+E_3$ which are supplied with direct current voltages of 5V and 15V, respectively. The set terminal $\overline{S}$ of the flip-flop 102 is connected to button 87*a* and to a terminal 105 adapted to be supplied with the inside reset signal from station select counter 14. The reset terminal $\overline{R}$ of flip-flop 102 is connected to output terminal 54 (FIG. 9) of the above described station select button detecting circuit 48. These set and reset signals are of [0] (grounded level). The output $\overline{Q}$ of flip-flop 102 (the output of flip-flop 102 is [0] in the set condition and [1] in the reset condition) controls station pulse generator 92*b* which is a nonstable multivibrator consisting of npn transistors 106*a* and 106*b*. The base of transistor 106*a* is grounded through a diode and the collector-emitter of an npn transistor 107 whose base is connected to the output terminal of flip-flop 102. If the flip-flop 102 is set and its output $\overline{Q}$ is [0], transistor 107 becomes non-conductive to cause oscillation of station pulse generator 92*b*. Conversely, if flip-flop 102 is reset and its output $\overline{Q}$ is [1], transistor 107 becomes conductive to stop oscillation of station pulse generator 92*b*. The station pulse generated by station pulse generator 92*b* is supplied to station select counter 14 which, in FIG. 21, is only represented by the station select counter 14*a* relating to 100 KHz.

The memory output discriminator 103 is shown to consist of an npn transistor 108, an FET 109 and a pnp transistor 110. The gate of FET 109 is connected to read out terminal 61 of memory means 59N (FIG. 12) and is grounded through the collector-emitter of transistor 108, and the drain of FET 109 is connected to the base of transistor 110. To the base of transistor 108 is supplied the output of the 1st bit of station select counter 14*a*. The output obtained at the collector of transistor 110 causes a trigger of the memory output delay circuit 104 of the succeeding stage. If the memory read out output is [1], FET 109 becomes conductive. Thus, transistor 110 also becomes conductive and an output appears at its collector and, as a result, it is possible to detect that the memory read out output is [1]. In this case, if the memory read out input is continuously [1], the memory output delay circuit 104 of the succeeding stage is triggered only one time. Thus, the first bit of station select counter 14*a* is monitored by transistor 107 in such a way that transistor 108 becomes conductive within a time corresponding to 1 bit of the memory. As a result, every time the memory read out output is continuously [1], the output pulse can be obtained at the ocllector of transistor 110. The output pulse from memory output discriminator 103 is supplied to terminal 28 of matrix decoder 24 (FIG. 4) and participates in the igniting of the neon lamps of panel display device 47.

The memory output delay circuit 104 is composed of a mono-stable multivibrator consisting of npn transistors 111*a* and 111*b*. When the source is connected to memory output delay circuit 104, transistor 111*a* becomes conductive and the memory output delay circuit 104 is triggered by the output pulse from the memory output discriminator 103 and, as a reset, a positive output pulse having a given pulse width is obtained at the collector of transistor 111*a*. The output pulse of the memory output delay circuit 104 is fed back to the base of control transistor 107 of the station pulse generator 92*b* to cause the oscillation thereof to terminate during the presence of the pulse output from memory output delay circuit 104. The collector of the other transistor 111*b* of memory output delay circuit 104 is led out to a terminal 112 at which is obtained a negative memory detecting output.

Figures 22A, 22B, 22C, 22D, 22E, 22F:
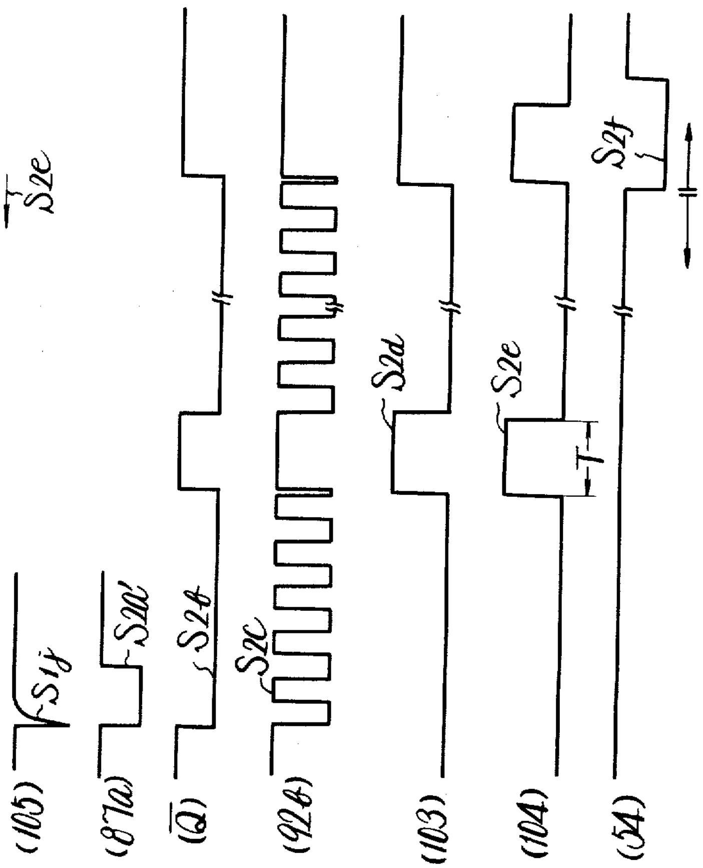
FIGS. 22A to 22F show waveforms to which reference will be made in explaining the operation of the circuit shown in FIG. 21.

With the above described construction of the control circuit for the scan mode, if the inside reset signal $S_{1j}$ (FIG. 22A) of station select counter 14, or the negative pulse $S_{29}'$ (FIG. 22A') generated when button 87*a* is pushed, is supplied to set terminal $\overline{S}$ of flip-flop 102, the output signal $S_{2b}$ of flip-flop 102 is changed from [1] to [0], as shown in FIG. 22B, to start the oscillation of station pulse generator 92*b*. Thus, the station select pulse $S_{2c}$ (FIG. 22C) is supplied to station select counter 14. In a manner similar to that described above for the station search mode, the content of station select counter 14 is changed in succession to scan memory 59N and panel display device 47. If the read out output of memory 59N is [0], no signal is supplied to terminal 28 so that the lamps of the panel display device 47 are not ignited. If the read out output of memory 59N is [1], a positive pulse output $S_{2d}$ (FIG. 22D) is obtained from memory read out discriminator 103. The pulse output $S_{2d}$ is supplied from terminal 28 to matrix decoder 24 and hence it is possible to ignite the respective lamp of display panel device 47 and obtain a positive output pulse $S_{2e}$ (FIG. 22E) having a pulse width T from memory output delay circuit 104. During the period when output pulse $S_{2e}$ is [1], transistor 107 becomes conductive to cause the oscialltion of station pulse generator 92*b* to terminate. As a result, the light emitting horn of the neon lamp of device 47 ignited by the oscillation output of station pulse generator 92*b* becomes long to effectively increase the illumination.

If one of the neon lamps of display panel device 47 which are illuminated in the scan mode, and which corresponds to the broadcast station from which the user wishes to receive the radio wave is pushed, to close the respective one of the switches $SW_1$...$SW_{70}$, the output terminal 54 of station select button detecting circuit 48 attains 0 level and signal $S_{2f}$ (FIG. 22F) is supplied to reset terminal $\overline{R}$ of flip-flop 102. Thus, flip-flop 102 attains its reset condition to make its output $\overline{Q}$ [1] and halt the oscillation of the station pulse generator 92*b*. Thus, the content of station select counter 14 is fixed at value thereof at the instant when the respective neon lamp is ignited and is maintained at such content corresponding to the desired station.

Figure 7:
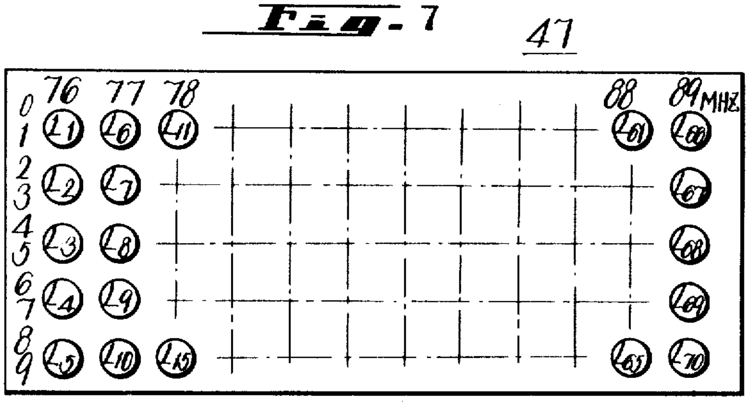
FIG. 7 is a plan view of a panel display device for use in the broadcast receiver according to the invention.

In the panel display device 47 of FIG. 7, each neon lamp represents two channels, and the scanning by the station select pulse occurs in the direction of decreasing frequencies, that is, from the higher frequency side toward the lower frequency side. For example, if the neon lamp $L_{21}$ representing the radio frequencies of 80.0 MHz and 80.1 MHz is pushed, the scan mode is usually halted at 80.1 MHz. However, if this neon lamp $L_{21}$ is pushed at the instant when the receiver is tuned to 80.0 MHz, the scan mode is halted at 80.0 MHz. When the scan mode is halted at 80.0 MHz and the desired station is broadcasting with the radio frequency of 80.1 MHz, or when the scan mode is halted at 80.1 MHz and the desired station is broadcasting with the radio frequency of 80.0 MHz, it is necessary to correct the scan mode to the tuning condition. In the present example, such correction is effected in association with the station search circuit 93 (FIGS. 16 and 18). When the radio frequency of 80.1 MHz is being received and the scan mode is halted at 80.0 MHz, then there is a deviation of 100 KHz from the tuned condition to generate a positive discriminating output (direct current voltage) $S_{3d}$ (FIG. 19D) at FM discriminator 3. The generation of such positive discriminating output $S_{3d}$ is detected by direct current level detector 95 (FIG. 18) and the resulting output is supplied to an AND gate 113*a*. A trigger signal $S_{3a}$ (FIG. 19A) generated at the down characteristic of the negative pulse appearing at the terminal 112 of the above described memory output delay circuit 104 (FIG. 21) is supplied to a terminal 114 (FIG. 18). The trigger signal $S_{3a}$ is supplied from terminal 114 to a delay circuit 115 comprising a multivibrator and differential circuit, and in which trigger signal $S_{3a}$ is trimmed to a rectangular wave signal $S_{3b}$ (FIG. 19B) from which is obtained a trigger pulse signal $S_{3c}$ (FIG. 19C). The trigger pulse signal $S_{3c}$ is supplied to AND gate 113*a*, and as a result, a first correct positive pulse $S_{3e}$ (FIG. 19E) is obtained at an output terminal 116*a* of AND gate 113*a*. This first correct pulse $S_{3e}$ is supplied to the outside reset terminal of station select counter 14 to reset it and thereby effect the scan mode again. When the neon lamp $L_{21}$ is pushed during the repeated scan mode, the probability is that the scan mode will be halted at 80.1 MHz for accurate tuning of the receiver to the station broadcasting with the radio frequency of 80.1 MHz.

Conversely, if the scan mode is halted at 80.1 MHz when the desired station is broadcasting with the radio frequency of 80.0 MHz, there is a deviation from the tuned condition of 100 KHz so that a negative discriminating output $S_{4d}$ (direct current) (FIG. 20D) is generated at FM discriminator 3. The negative discriminating output is detected by direct current level detector 95 whose detected output is applied to an AND gate 113*b* (FIG. 18). As before, a trigger signal $S_{4a}$ (FIG. 20A) is generated at the down characteristic of the negative pulse appearing at terminal 112 of memory output delay circuit 104 (FIG. 21) and is supplied to terminal 114 for conversion by delay circuit 115 into signals $S_{4b}$ and $S_{4c}$ (FIGS. 20B and 20C). The output $S_{4c}$ from delay circuit 115 is applied to AND gate 113*b* with the result that a second correct pulse $S_{4e}$ (FIG. 20E) is obtained at the output terminal 116*b* of gate 113*b*. The second correct pulse $S_{4e}$ is supplied from output terminal **116 *b* to conductor 14*a* (relating to 100 KHz) of station select counter 14. That is, the content of station select counter 14 is caused to be advanced by 100 KHz from 80.1 MHz to 80.0 MHz by means of the second correct pulse to obtain accurately the tuned condition. In the tuned condition, the output of FM discriminator 3 becomes zero as shown by the thick lines in FIGS. 19D and 20D. The delay circuit 115** is capable of discriminating the tuned condition at the time when the phase lock loop is brought into the stable state.

By way of summary, it is to be noted that the station-search mode of operation achieves the storage or recording in memory 59N of those stations which can be received by the broadcast receiver at a particular location of the latter; that the scan mode of operation serves to indicate on panel display device 47 those stations which can be received by the illumination of the respective lamps of display device 47; and that the station-select operation, initiated by the depressing of a lamp of display device 47 which is illuminated during a scan mode of operation, serves to tune the receiver to the broadcasting frequency of the respective station which is thus selected. If, thereafter, it is desired to select another station, the button **87*a* is depressed to initiate another scan mode of operation during which the illuminated lamp of display device 47** corresponding to such other station is depressed to halt the scan mode with the receiver tuned to the desired station.

The systematic operations of the above described circuits for achieving the station-search, scan and station-select operations are as follows:

If station-search button **88*e* is pushed, station pulse generator 92*a* starts to operate after a given delay of time TE. The counter 14 is set to [000] until the first pulse of station pulse generator 92*a*** occurs. During the given time T*o*, the local oscillator of front end 1 oscillates at the frequency of 79.4 MHz. In this case, the frequency of the output signal of 1/4 divider 8 is 3650 KHz. This output signal is supplied to terminal **8*a* of 1/N divider 9. The counters 11*a*,11*b* and 11*c* of 1/N divider 9 are initially set to [000], and hence serve to count the pulses from 1/4 divider 8 until these pulses shift from [0] to [146]. Then, discriminator 15 discriminates [146] to supply one pulse to terminal 16. This means that the frequency of the output signal of 1/4 divider 8 is divided by 146. The frequency signal divided by 146 is supplied from reference frequency oscillator 11 through 1/4 divider 12 to comparator 10 where the frequency and phase are compared. At the time when the content of counter 14 is [000], the output of counter 14 is capable of indicating 89.9 MHz on the Nixie indicator tubes of indicator device 23 and of making transistors 25*a* and 38*a* of matrix decoder 24 conductive through decoder 20 (FIG. 4). The output of flip-flop 91 makes transistor 37 conductive to ignite lamp element $L_{70}$ of display device 47 (FIG. 8). If a broadcast wave of 89.9 MHz is present, a given output is supplied from FM discriminator 3 and IF amplifier 2 to station search circuit 93 (FIG. 16) and, as a result, the output of write signal generator 101 serves to turn on or close the switch 67*a* of memory control circuit 63 for writing [1] onto the respective memory element $Q_{70}$ (FIG. 12). If a broadcast wave of 89.9 MHz is not present, no signal appears at station search circuit 93. Thus, switch 67*a* remains open and the memory is not operated. The above mentioned operations are effected at the time when the content of counter 14** is [000].

As soon as the 1/146 division is effected and the pulse appears at terminal 16, the pulse signal $S_{1d}$ (FIGS. 16 and 17D) is supplied from station pulse generator **92*a* to counter 14 whose content is changed into [001] and gate 13 is opened. Thus, counters 11*a*, 11*b* and 11*c* of 1/N divider 9 are set to [001]. In this condition, 145 pulses are supplied from terminal 8*a* until discriminator 15 detects the numerical constant [146] and hence one pulse appears again at terminal 16. This means that the pulse signal of 3625 KHz from 1/4 divider 8 is divided by 145. Since the elements of display device 47 and memory means 59N are the same for 89.9 MHz and 89.8 MHz, the above operation is carried out in the same manner as in the case of receiving 89.9 MHz. As soon as the pulse generated by the 1/145 division appears at terminal 16, the pulse signal is supplied from station pulse generator 92*a* to counter 14 whose content is set to [002]. At this time, gate 13 is opened and the content of counter 14 is sent to counters 11*a*,11*b* and 11*c***.

In such condition, when 144 pulses are supplied from terminal **8*a*, discriminator 15 detects the given numerical constant [146]. Thus, lamp element $L_{69}$ of display device 47 is ignited. At this time, if a radio wave of 89.7 MHz is present, the output of FM discriminator 3 and IF amplifier 2 operates station search circuit 93 to generate the memory write signal, and as a result, [1] is stored in the respective memory element $Q_{69}$ of memory 59N**.

The above described operations are repeated unitl finally reset pulse $S_{1J}$ from counter 14 (FIGS. 16 and 17J) permits flip-flop 91 to be reset so as to halt the oscillation of station pulse generator **92*a***, at which time the station search from 89.9 MHz to 76.1 MHz has been completed.

The second station pulse generator **92*b* (FIG. 21) is triggered by the reset pulse $S_{1J}$. The output signal $S_{2c}$ thus generated can again drive counter 14. In a manner similar to that described above for the station-search mode, the content of counter 14 counts the pulses of pulse generator 92*b*** and is changed from [000] to [138].

Under such conditions, that is, when the station-search mode has been selected, all of switches **67*a*,67*m* and 67*b* of memory control circuit 63 (FIG. 13) are open, so that the output signal of matrix decoder 24, that is, the level of the address signals is fixed at 10V. If, for example, the frequencies of the radio waves broadcast by the stations which are capable of being received at the particular location of the receiver are 89.9 MHz, 89.0 MHz and 77.2 MHz, respectively, then the memory elements $Q_{70}$,$Q_{66}$ and $Q_7$ each record unit [1]. The output signal [1] is obtained from terminal 61 when the row lines $X_{51}$ to $X_{11}$ and the column lines $Y_{141}$ to $Y_{11}$ which correspond to those memory elements $Q_{70}$,$Q_{66}$ and $Q_7$ are scanned by the address signals in the time division. For example, if address signals are supplied to row line $X_{51}$ and column line $Y_{141}$, that is, the location of memory element $Q_{70}$, the signal [1] is supplied from terminal 61 to memory output discriminator 103 (FIG. 21). Thus, during the time T, the oscillation of pulse generator 92*b* is halted and transistor 37 becomes conductive, and, as a result, lamp $L_{70}$ is ignited for a long time. When address signals are supplied to the other row and column lines, similar operations are effected. If the switch $SW_{70}$ of lamp $L_{70}$ is closed or turned on during the illumination of lamp $L_{70}$, terminal 54 of circuit 48 (FIG. (9) takes the level [0] and the output of flip-flop 102 becomes [1]. Thus, the oscillation of pulse generator 92***b* is halted and the content of counter 14 is maintained at [000] so that 1/N divider 9 always effects the 1/146 division and the radio wave with a frequency of 89.9 MHz may be received.

During the oscillation of pulse generators 92*a* and 92*b*, or any other pulse generators to be described later, muting circuit 4 is operated. When the oscillations of all of the pulse generator are halted, the muting operation of muting circuit 4 is stopped, and the stereophonic composite signals are transmitted from discriminator 3 to multiplexer 5 for reproduction of the stereophonic sound.

The receiver according to the illustrated embodiment of the invention is intended to be selectively operable with modes in addition to the described station-search, scan and station-select modes of operation. For example, the button 87*b* can be depressed to select a "next" mode of operation during which, for each actuation of button 87*b*, the receiver is tuned to the station previously stored in memory 59N which has the next lower frequency to that of the station to which the receiver was previously tuned. Thus, after a station-search mode of operation for storing in memory 59N all of the stations which can be received, button 87*b* can be depressed repeatedly to tune the receiver to these stored stations in succession in the order of descending frequencies. Further, upon each actuation of button 87*b* for selecting the next mode of operation, the lamp of display panel 47 which corresponds to the station to which the receiver is thereby tuned is illuminated to indicate such station.

When the button 87*c* is actuated to select a "repeat" mode of operation, the receiver is successively tuned to the frequencies of the stations previously stored in memory 59N in the order of descending frequencies and remains tuned to each station for only a predetermined period during which the listener can monitor the contents of the program being broadcast by the several stations. Once again, as the receiver is tuned to each of the stations stored in memory 59N, the respective lamp of display device 47 is illuminated to identify such station.

When button 87*d* is actuated to a "shift" mode of operation, the content of station select counter 14 is changed repeatedly, for so long as button 87*d* is depressed, whereby to alter the frequency to which the receiver is tuned in 100 KHz increments in the direction of decreasing frequencies, and, as the tuned frequency is changed, the lamps of panel display device 47 are illuminated in corresponding order. Thus, the receiver can be tuned manually to any desired frequency in the FM braodcast band without regard to whether such frequency has been previously stored in memory 59N.

Finally, each time button 87*e* is actuated to select a "step" mode of operation, the content of station select counter 14 is changed to change the frequency to which the receiver is tuned by 100 KHz in the direction of decreasing frequency, and the respective lamp of display device 47 is illuminated to indicate the frequency to which the receiver is tuned. Thus, by repeatedly actuating the button 87*e*, the tuner can be manually tuned, in a step-by-step manner, to any desired frequency in the FM broadcast band. Once again this tuning mode is independent of the storage of receivable stations in the memory 59N.

Figure 23:
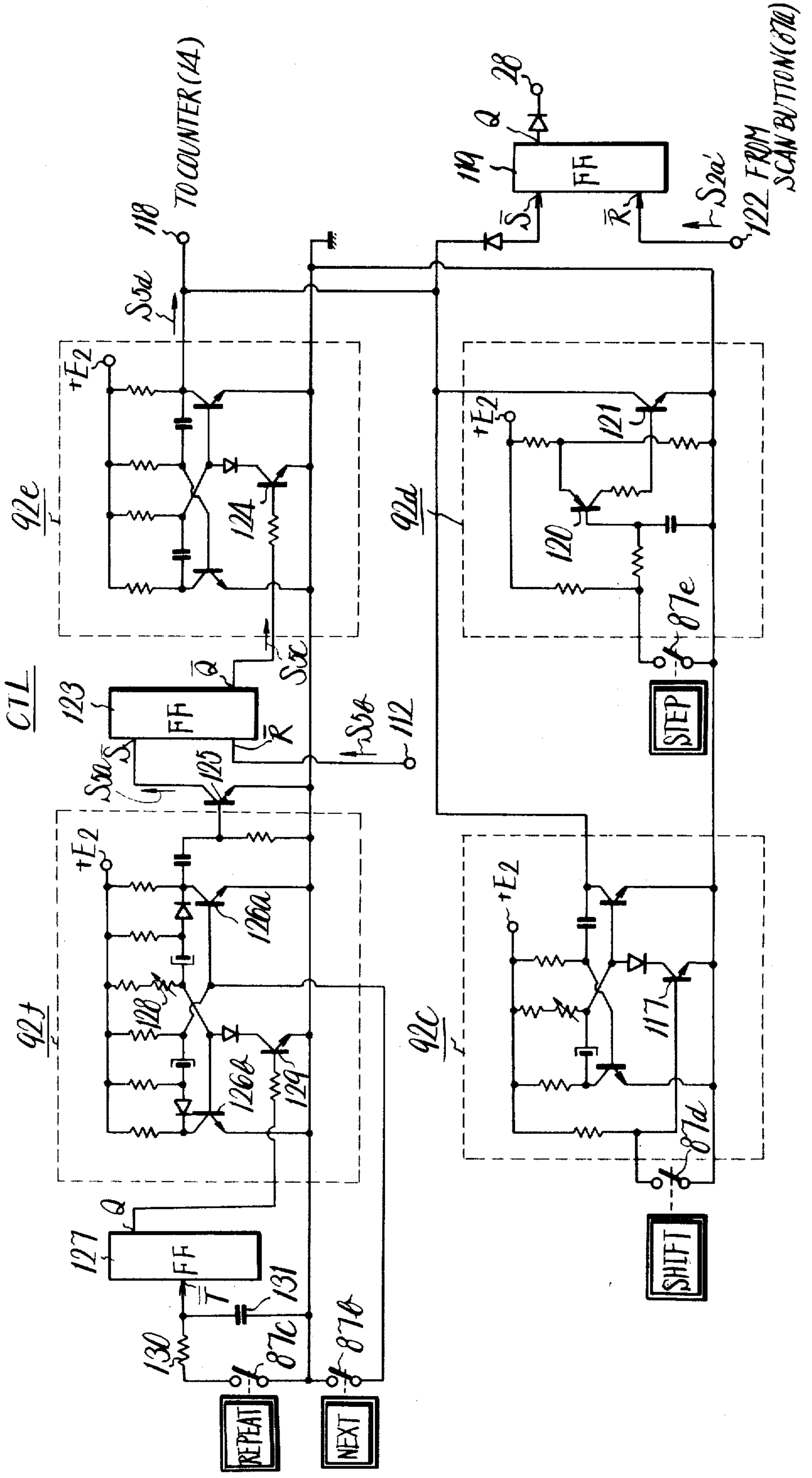
FIG. 23 is a circuit diagram of arrangements provided for achieving other functions of the broadcast receiver according to the invention.

The control circuits relating to the shift and step modes will now be described in detail with reference to FIG. 23 and are there shown to include station pulse generators 92*c* and 92*d*, respectively. The station pulse generator 92*c* is in the form of a nonstable multivibrator similar to that employed in the above described station pulse generators 92*a* and 92*b*. An npn transistor 117 for controlling the station pulse generator 92*c* is made conductive by the voltage applied to its base from a source terminal $+E_2$, whereupon, station pulse generator 92*c* does not oscillate. As a result, no station pulse is obtained at a terminal 118 which is connected to counter 14, and hence the station select counter 14 is not set. However, when button 87*d* is pushed to close the respective switch, the base of control transistor 117 is grounded and transistor 117 becomes nonconductive. Thus, station pulse generator 92*c* is made to oscillate and, as a result, the station pulse is supplied from terminal 118 to station select counter 14 so long as button 87*d* is depressed. The output of station pulse generator 92*c* is also supplied to the set terminal $\overline{S}$ of flip-flop 119 to set the latter. The output Q [1] of the set flipflop 119 is supplied to terminal 28 of the matrix decoder 24 (FIG. 4) and the neon lamp of panel display device 47 located at the position determined by the content of station select counter 14 is ignited irrespective of the read out output from memory 59N. Thus, during pushing of button 87*d*, the neon lamps $L_{70}$ through $L_1$ are ignited in succession in the order of descending frequencies and the tuned frequency of the receiver is correspondingly changed. The station pulse generator 92*d* consists of a pnp transistor 120 and npn transistor 121. The transistor 120 is normally nonconductive so that transistor 121 is also nonconductive and its collector does not supply any output. If the button 87*e* is pushed, transistor 120 becomes conductive, and as a result, transistor 121 also becomes conductive and its collector supplies an output in the form of a single station pulse from terminal 118 to station select counter 14 and also to the set terminal $\overline{S}$ of flip-flop 119. Thus, every time button 87*e* is pushed, one station pulse is generated to change the constant of station select counter 14 and to illuminate the respective lamp of display device 47 irrespective of the presence or absence of a read out output from memory 59N. The trigger signal $S_{2a}$, generated when the button 87*a* is pushed is supplied from a terminal 122 to the reset terminal $\overline{R}$ of the flip-flop 119.

The next mode of operation is realized by a station pulse generator 92*e* which is controlled by the output $\overline{Q}$ of a flip-flop 123. The station pulse generator 92*e* is in the form of a nonstable multivibrator comprising an npn control transistor 124 whose base is connected to the output terminal $\overline{Q}$ of flip-flop 123. The set terminal $\overline{S}$ of flip-flop 123 is grounded through the collector-emitter path of an npn transistor 125 whose base is grounded through the collector-emitter path of an npn transistor 126*a*. Between the base of transistor 126*a* and ground is interposed the switch of button 87*b*. The transistor 126*a* is seen to be one of the transistors of a repeat signal generator 92*f* which is in the form of a nonstable multivibrator. When button 87*b* is pushed, transistor 125 becomes conductive to set flip-flop 123 whose output $\overline{Q}$ becomes [0]. Thus, station pulse generator 92e starts to oscillate and the resulting station pulse is supplied from terminal 118 to station select counter 14 and at the same time sets the flip-flop 119. The flip-flop 123 is reset by a memory read out output [1] from memory 59N to halt the oscillation of station pulse generator 92e. Thus, every time button 87b is pushed, the receiver is tuned to the frequency of the station stored in memory 59N which has the next lower frequency to that of the station to which the receiver was previously tuned, and the corresponding lamp of display device 47 is illuminated to identify the station to which the receiver is newly tuned.

The repeat mode is realized by the above described station pulse generator 92e, flip-flop 123, repeat signal generator 92and a flip-flop 127. The repeat signal generator 92f which, as mentioned above, is a nonstable multivibrator, comprises a transistor 126b in addition to transistor 126a. The oscillating period of repeat signal generator 92f is very long and may be adjusted to any value from 2 to 10 sec. by adjusting a variable resistor 128. The repeat signal generator 92f further comprises an npn control transistor 129 whose base is connected to the output terminal Q of flip-flop 127. The flip-flop 127 is of the type having one input which reverses its state every time an input signal is applied thereto and has an input terminal $\overline{T}$ grounded through the switch of button 87c. Further, a resistor 130 and condenser 131 are connected to input terminal $\overline{T}$, as shown, for the purpose of preventing chatter effect.

With the above described arrangement, the output Q of the flip-flop 127 is normally [1] to halt the oscillation of repeat signal generator 92f. When button 87c is pushed, repeat signal generator 92f starts its oscillation and its output is differentiated at its down part to supply a repeat signal $S_{5a}$ (FIG. 24A) to set terminal $\overline{S}$ of flip-flop 123. The reset terminal $\overline{R}$ of flip-flop 123 is supplied with a memory detected output $S_{5b}$ (FIG. 24B) from terminal 112 of memory output delay circuit 104 (FIG. 21) so that flip-flop 123 is reset every time the detect output $S_{5b}$ is [1]. The output of flip-flop 123 becomes a rectangular wave signal $S_{5c}$ (FIG. 24C). The pulse generator 92e oscillates only when the output $\overline{Q}$ of flip-flop 123 is [0] so that the output $S_{5d}$ (FIG. 24D) is obtained from station pulse generator 92e. The output $S_{5d}$ is supplied from terminal 118 to station select counter 14 and also to the set terminal of flip-flop 119 at the time of initiating the oscillation. Thus, if button 87c is pushed once, the receiver is tuned in succession, in the direction of decreasing frequencies, to the stations stored in memory 59N and remains tuned to each station only for the time determined by the period of the repeat signal generator 92f. As the receiver is tuned to each of the stored stations, in succession, the respective lamp of display device 47 is illuminated to identify such station.

Normally, it is sufficient to write or store in memory 59N all of the stations from which the receiver can receive the broadcast radio waves at the particular locations of the receiver. If an extremely large number of stations can be received by the receiver, an individual may be interested only in the programs broadcast by a limited number of those receivable stations. Accordingly, a receiver according to one embodiment of the invention can considerably simplify the station-select operation by storing the limited number of desired stations beforehand in another or second memory 59P.

FIG. 25 illustrates diagrammatically the relation between the memory 59N and the second memory 59P (hereinafter called a program memory). The program memroy 59P is similar to the previously described memory 59N and has a memory control circuit 63' the construction of which is the same as that of memory control circuit 63 is closed, the corresponding switch of memory control circuit 63' is opened. The memory control circuits 63 and 63' are supplied with the address signal formed at matrix decoder 24.

In order to store a given program in program memory 59P, the button 88b is pushed or actuated and a flip-flop 150 is thereby triggered. Switch 67m of memory control circuit 63 incorporated in memory 59N is closed by means of one of the outputs Q, while the corresponding switch of memory control circuit 63' incorporated in program memory 59P is closed by another output $\overline{Q}$. As described above, when switch 67m is closed, transistor 75 becomes conductive and the address signals flow to ground without being supplied to the memory 59N. If the corresponding switch of the control circuit 63' is opened, the address signals from matrix decoder 24 are supplied to program memory 59P. If the button 88d is pushed, a trigger output (not shown) serves to supply an erase signal to program memory 59P to erase the content previously stored therein and extinguish the lamp of button 88a and ignite the lamp of button 88b. When button 88b is pressed or actuated so that the address signal is turned over from the memory 59N to the memory 59P by means of the outputs Q and $\overline{Q}$ of flip-flop 150, the actuation of button 87b or 87c, for example, causes station pulse generator 92f or 92e to start its oscillation and given outputs appear at the terminals 28 and 118, respectively. Thus, counter 14 operates to tune the receiver to a station previously stored in memory 59N, as described above. At this instant, if button 88c is pushed, all of the switches of memory control circuit 63' which correspond to switches 67m,63a and 63b of memory control circuit 63 are opened. Thus, the address signal from matrix 24 is recorded on the respective memory element of the program memory 59P. In order to store another station in program memory 59P, the button 87b may be pushed again to operate counter 14 and thereby tune the receiver to that other station. Then, the button 88c is pushed again to store the station in the program memory 59P.

Although the above described embodiment of the invention is applied to the FM band employed in Japan, and in which the stations are spaced apart by 100 KHz, the invention can be applied to other FM bands, for example, as in the United States, where the stations are spaced apart by 200 KHz within the band of frequencies from 88.1 MHz to 107.9 MHz. In the latter case, there are 100 stations from which it follows that numbers from 0 to 99 may be brought into correspondence with the radio frequencies with a ratio of 1:1; these numbers may be made the content of station select counter 14; and this content of station slect counter 14 may be added to the divide ratio to determine the given numerical constant. Use may be made of a mixer having the local frequency of 120 MHz for the purpose of demultiplying the frequency of the output of the local oscillator. The panel display device 47 and memory 59N for such application are in the form of matrices each having 10 rows and 10 columns. The outputs of the two station select counters corresponding to the first and second figures of the decimal number from 0 to 99 are converted into the decimal number of every figure by means of the binary-decimal decoder. This decimal number is used as the row and column direction signals which are supplied to the panel display device and memory as the lamp drive signal and address specify signal, respectively. If it is desired to form the row direction by the figure of 100 KHz only, the lamp of each column from the fifth row to 10th row of the panel display device arranged in 10 rows and 10 columns may be inserted between the first and second columns, between the second and third columns .... between the ninth and tenth columns, respectively. However, since the content of the station select counter does not have the relation of a complemental number to the corresponding radio frequency, it is difficult to drive the Nixie tube indicator by the output of the station select counter. In this case, however, it is not necessary to use the tuning discriminator etc, in the above mentioned matrix decoder 24 and in the station search circuit 93, and hence the construction as a whole becomes simpler than that of the embodiment of the invention, which has been described above for applcation to the FM band in Japan. The invention may be applied to television receivers, AM radio receivers and other broadcast receivers, as well as to the specifically described FM receiver.

Although illustrative embodiments of the invention have been described in detail with reference to the accompanying drawings, it is to be understood that the invention is not limited to those precise embodiments, and that various changes and modifications may be effected therein by one skilled in the art without departing from the scope or spirit of the invention.

What is claimed is:

1. A broadcast receiver comprising:

a. means for dividing a broadcast band into a plurality of frequency ranges, b. display means having a plurality of indicator elements each corresponding to a respective one of said frequency ranges, c. means for generating pulse signals upon each division of said broadcast band and for energizing the indicator element of said display means which corresponds to the respective divided frequency range, d. memory means including a plurality of memory elements each corresponding to a respective one of said frequency ranges, e. means for detecting the reception of broadcast signals, and f. means responsive to the detection of broadcast signals by said detecting means for storing a signal in the memory element of said memory means which corresponds to the divided frequency range then obtaining.

2. A broadcast receiver according to claim 1; further comprising a variable local oscillator for generating a local frequency signal; and in which said means for dividing a broadcast band includes a divider for dividing the frequency of said local frequency signal, and a counter the content of which is varied sequentially in accordance with said pulse signals, the dividing ratio of said divider being varied in accordance with variation of the content of said counter.

3. A broadcast receiver according to claim 2; in which said means for dividing a broadcast band further includes a reference signal generator, a comparator for comparing frequencies and phases of the divided signal from said divider and of a reference signal from said reference signal generator and for providing a corresponding output, and means for varying the frequency of the signal from said local oscillator in accordance with said output from the comparator.

4. A broadcast receiver according to claim 1; further comprising read-out means for reading out a signal stored in any of said memory elements of the memory means.

5. A broadcast receiver according to claim 4; in which said signal read out by said read-out means is supplied to said display means so as to energize a respective one of said indicator elements.

6. A broadcast receiver according to claim 5; in which said indicator elements of said display means have switches associated therewith.

7. A broadcast receiver according to claim 6; in which switch detecting circuit means is connected to said switches of said display means for detecting the open and closed states of said switches, and outputs from said switch detecting circuit means are applied to said dividing means which, thereby, extract a predetermined frequency range from said broadcast band.

8. A broadcast receiver according to claim 6; in which said dividing means for dividing a broadcast band includes a local oscillator for generating a local frequency signal, a divider for dividing the frequency of said local frequency signal, a pulse generator, a counter the content of which is varied sequentially in accordance with the pulses generated by said pulse generator for varying the dividing ratio of said divider in accordance with the variation of the content of said counter, a reference signal generator, a comparator for comparing the frequency and phase of the divided frequency signal derived from said divider with the frequency and phase of a reference signal derived from said reference signal generator and for producing a corresponding comparison output and a control circuit for varying the frequency of said local frequency signal from said local oscillator in accordance with said comparison output, said pulse generator being controlled by said output signals from said switch detecting circuit means so as to be rendered inoperative upon the detection of one of said switches in the closed state thereof.

9. A broadcast receiver according to claim 8; in which said pulse generator is further controlled with the read out signal from said read out means.

10. A broadcast receiver according to claim 9; further comprising a control circuit for said pulse generator by which operation of said pulse generator is restarted a predetermined time interval after its operation is stopped in response to an output signal from said switching detecting circuit means.

11. A broadcast receiver according to claim 8; further comprising a manually actuable mode selecting switch, and a second pulse generator producing a single pulse for correspondingly changing the content of said counter each time said mode selecting switch is actuated.

12. A broadcast receiver according to claim 8; further comprising a manually actuable mode selecting switch, and a second pulse generator which produces pulses for sequentially changing the content of said counter for the time interval during which said mode selecting switch is actuated.

13. A broadcast receiver according to claim 8; further comprising a manually actuable mode selecting switch, a second pulse generator which generates pulses for changing the content of said counter in response to actuation of said mode selecting switch, and means for halting the operation of said second pulse generator in response to the reading out of a signal from said memory means by said read-out means.

14. A broadcast receiver according to claim 13; further comprising means for restarting the operation of said second pulse generator a predetermined time interval after said operation is halted by a signal from said read-out means.

15. A broadcast receiver according to claim 1; further comprising means for erasing any signals stored in said memory elements of the memory means.

16. A broadcast receiver according to claim 1; further comprising a second memory means including a plurality of memory elements each corresponding to a respective one of said frequency ranges, and selectively operable means for storing a signal in the memory element of said second memory means which corresponds to the divided frequency range then obtaining in the event that said detecting means detects the reception of broadcast signals at said divided frequency range.

17. A broadcast receiver according to claim 16; in which said selectively operable means for storing a signal includes a manually actuable switch.

18. A broadcast receiver according to claim 16; further comprising means for erasing any signals stored in said memory elements of the second memory means.

19. A broadcast receiver according to claim 1; in which said means for dividing a broadcast band includes a variable local oscillator for generating a local frequency signal, a divider for dividing said local frequency signal by a variable dividing ratio, and a counter having its content varied sequentially by said pulse signals and changing said dividing ratio of the divider in correspondence with said content, and said indicator elements of the display means and said memory elements of the memory means are arranged in rows and columns to form respective matrices; and further comprising address signal generator means connected between said counter and said display and memory means and producing row and column address signals in correspondence with the content of said counter, which row and column address signals are applied to the indicator and memory elements situated in the respective rows and columns.

20. A broadcast receiver according to claim 19; further comprising read-out means for reading out any signals stored in said memory elements as said row and column address signals are applied to said memory elements, and means applying the signals read out by said read-out means to the corresponding indicator elements for energizing the latter.

21. A broadcast receiver according to claim 20; further comprising a switch associated with each of said indicator elements and being closed in response to manual actuation of the respective indicator element, switch detecting means for detecting the closed state of each of said switches, and a second pulse generator operative to change the content of said counter and being rendered inoperative when said switch detecting means detects the closed state of one of said switches.

22. A broadcast receiver according to claim 21; further comprising circuit means for halting the operation of said second pulse generator in response to the read out of a signal from said memory means by said read-out means.

23. A broadcast receiver according to claim 22; in which said circuit means for halting operation of said second pulse generator includes means to restart said operation following a predetermined time interval.

24. A broadcast receiver according to claim 19; in which each of said memory elements is a semiconductive element having first, second and third electrodes, said first electrode being supplied with one of said row and column address signals, said second electrode being supplied with a predetermined voltage and said third electrode being supplied with the other of said address signals, respectively.

25. A broadcast receiver according to claim 24; further comprising a memory control circuit connected to said first electrode of each memory element and which controls the potential of said one address signal in at least three steps.

26. A broadcast receiver according to claim 25; in which said memory control circuit controls said one address signal to apply a first potential to said first electrode during storing of a signal in the respective memory element, to apply a second potential to said first electrode by connection to a negative voltage source for erasing a signal from the respective memory element, and to otherwise apply a third potential to said first electrode during the reading out of a signal stored in the respective memory element.

27. A broadcast receiver according to claim 26; further comprising read-out means connected with said second electrode of each of said memory elements for reading out any signals stored in said memory elements as said row and column address signals are applied to said memory elements with said one address signal being controlled to apply said third potential to said first electrode of each memory element.

28. A broadcast receiver according to claim 19; in which each of said indicator elements is a neon lamp.

29. A broadcast receiver comprising:

a. a variable local oscillator for generating local frequency signals, b. a divider for dividing the local frequency signal from said local oscillator by a variable dividing ratio, c. a pulse generator, d. a counter, the content of which is varied in accordance with the number of pulses generated by said pulse generator, for varying said dividing ratio of the divider in accordance with the variation of said content of the counter, e. A comparator for comparing the frequency and phase of the output signal from said divider and of a reference signal and producing a corresponding output signal, f. a control circuit for varying the frequency of the local frequency signal from said local oscillator in accordance with said output signal from the comparator, g. an address signal generator controlled by the content of said counter and producing a plurality of row and column address signals in a time divisional manner, and h. a display device including indicator elements arranged in a plurality of rows and columns and receiving said row and column address signals for energizing said indicator elements sequentially in accordance with the content of said counter.

30. A broadcast receiver according to claim 29; in which each of said indicator elements is a neon lamp.

31. A broadcast receiver according to claim 29; in which the number of said indicator elements is equal to the number of dividing ratios of said divider.

32. A braodcast receiver comprising:

a. means for detecting the reception radio waves, b. a variable local oscillator for generating local frequency signals, c. a divider for dividing said local frequency signals by a variable dividing ratio, d. a pulse generator, e. a counter, the content of which is varied in accordance with a number of pulses generated by said pulse generator, for varying said dividing ratio of the divider in accordance with the variation of said content, f. a comparator for comparing the output signal from said divider with a reference signal in a frequency and phase and for producing a corresponding output signal, g. a control circuit for varying the local frequency signal from said local oscillator in accordance with said output signal from the comparator, h. memory means including a plurality of non-voltaic memory elements, and i. circuit means connected between said detecting means and said memory means for storing a memory signal in a selected one of said memory elements in response to the detection of the reception of radio waves by said detecting means.

33. A broadcast receiver according to claim 32; further comprising an address signal generator which is controlled by the content of said counter and produces address signals corresponding to a plurality of rows and columns in a time divisional manner; and in which said memory elements of said memory means are arranged in a plurality of row and column directions and supplied with said address signals, respectively.

34. A broadcast receiver according to claim 33; in which said memory means further includes read-out means for reading out signals stored in said memory elements; and further comprising means responsive to a read out signal from said read-out means to stop the operation of said pulse generator during a predetermined time interval.

35. A broadcast receiver according to claim 32; in which each of said non-voltaic memory elements of said memory means consists of a semiconductive element having first, second and third electrodes, and said first electrode is supplied with a pulse in response to said detection of radio waves by said detecting means.

36. A broadcast receiver according to claim 35; further comprising a source of negative voltage, and switch means actuable for connecting said first electrode to said negative voltage source for erasing a signal stored in said memory element.

37. A broadcast receiver according to claim 33; in which each of said memory elements is a semiconductive element having first, second, and third electrodes, one of said row and column address signals is applied to said first electrode, said circuit means is connected with said second electrode for applying the output of said detecting means thereto, and the other of said address signals is applied to said third electrodes; and further comprising an electric source connected with said second electrode.

38. A broadcast receiver according to claim 37; further comprising means for connecting said second electrode to read-out means for reading out a signal stored in said memory element.

39. A broadcast receiver according to claim 32; further comprising a manually actuable mode selecting switch, and a second pulse generator producing a single pulse for correspondingly changing the content of said counter each time said mode selecting switch is actuated.

40. A broadcast receiver according to claim 32; further comprising read-out means operable for reading out signals stored in said memory elements, a manually actuable mode selecting switch, a second pulse generator which generates pulses for changing the content of said counter in response to actuation of said mode selecting switch, and means for halting the operation of said second pulse generator in response to the reading out of a signal from said memory means by said read-out means.

41. A broadcast receiver comprising:

a. a detector for providing a detector output upon detecting the reception of radio waves, b. a variable local oscillator for generating local frequency signals, c. a divider for dividing said local frequency signals by a variable dividing ratio, d. a pulse generator, e. a counter, the content of which is varied in accordance with the number of pulses generaged by said pulse generator, for varying said dividing ratio of the divider, f. a comparator for comparing the output signal from said divider with a reference signal in frequency and phase and for producing a comparison output, g. a control circuit for varying the frequency of the local frequency signal from said local oscillator in correspondence with said output from said comparator, h. an address signal generator controlled by the content of said counter and producing a plurality of row and column address signals in a time divisional manner, i. a display means including indicator elements arranged in a plurality of rows and columns and being controllable by said address signals corresponding to the respective rows and columns.

j. memory means including a plurality of non-voltaic memory elements arranged in rows and columns and receiving said address signals corresponding to the respective rows and columns, and k. memory control circuit means actuable by said detector output for causing one of said address signals then received by a memory element to store a memory thereof in said element.

42. A broadcast receiver according to claim 41; further comprising stop circuit means responsive to the attainment of a predetermined value by said content of the counter for halting the operation of said pulse generator.

43. A broadcast receiver according to claim 42; further comprising a second pulse generator, means for initiating operation of said second pulse generator in response to said halting of the operation of the first mentioned pulse generator by said stop circuit means, and means for applying to said counter the pulse generated by said second pulse generator upon operation of the latter.

44. A broadcast receiver according to claim 41; further comprising read-out means for reading out said memory stored in any of said memory elements, and means for energizing said indicator elements of said display means by the output from said read-out means.

45. A broadcast receiver according to claim 41; further comprising a stop pulse generator for producing a stop pulse when the content of said counter becomes a predetermined value, means responsive to said stop pulse for halting operation of said pulse generator, a second pulse generator which has its operation initiated by said stop pulse, a circuit for applying the pulse from said second pulse generator to said counter, read-out means for reading out said memory stored in any of said memory elements, means for energizing said indicator elements of said display means by the output from said read-out means, and a circuit for stopping the operation of said second pulse generator for a predetermined time interval in response to said output from said read-out means.

46. A broadcast receiver according to claim 45; in which each of said indicator elements of said display means has associated manually closable switch means.

47. A broadcast receiver according to claim 46; further comprising switch detector means for detecting the closing of said switch means, and circuit means for starting the operation of said second pulse generator in response to an output signal from said switch detector means.

48. A broadcast receiver according to claim 45; in which each of said indicator elements of said display means is a neon lamp and has a manually operable switch connected in parallel thereto.

49. A broadcast receiver according to claim 41; further comprising a manually actuable mode selecting switch, a second pulse generator operable to produce a single pulse on each actuation of said mode selecting switch, and means for applying the last mentioned pulse to said counter and to said display means.

50. A broadcast receiver according to claim 41; further comprising a manually actuable mode selecting switch, a second pulse generator operable to produce pulses so long as said mode selecting switch is actuated, and means for applying the last mentioned pulses to said counter and to said display means.

51. A broadcast receiver according to claim 41; further comprising a manually actuable mode selecting switch, a second pulse generator for prouding pulses upon the actuation of said mode selecting switch, means for applying the last mentioned pulses to said counter for varying said content thereof, readout means for reading out said memory stored in any of said memory elements, and means for halting the operation of said second pulse generator in response to the read out of a memory by said read-out means.

52. A broadcast receiver according to claim 51; further comprising means for restarting the operation of said second pulse generator a predetermined time interval following said halting of the operation by said read out.

53. A broadcast receiver according to claim 41; in which each of said memory elements is a semiconductive element having first, second and third electrodes thereon, and said memory control circuit means is connected to said first electrode.

54. A broadcast receiver according to claim 53; in which memory control circuit means includes potential changing means for changing the potential of said one address signal applied to said first electrode in at least three steps.

55. A broadcast receiver according to claim 54; in which said potential changing means includes a resistive divider for selectively establishing first and second potential level steps, and a source of negative voltage for establishing a third potential level step.

56. A broadcast receiver according to claim 55; in which said resistive divider is controlled by said detector output.

57. A broadcast receiver according to claim 41; further comprising circuit means for erasing said memory stored in any of said memory elements by the application to the latter of a predetermined potential.

58. A broadcast receiver according to claim 57; in which said circuit means for erasing said memory includes a source of negative voltage and is controllable by said memory control circuit means.

59. A broadcast receiver according to claim 41; in which each of said memory elements includes a semiconductive element having first, second and third electrodes thereon, said first electrode receives one of said address signals and said third electrode receives the other of said address signals, and an electric power source is provided for connection to said second electrode.

60. A broadcast receiver according to claim 59; further comprising read-out means connected with said second electrode of said memory element for reading out said memory stored therein.

61. A broadcast receiver according to claim 41; further comprising second memory means including a plurality of non-voltaic memory elements arranged in rows and columns and receiving said address signals corresponding to the respective rows and columns, second memory control circuit means actuable by said detector output for causing said one of the address signals then received by a memory element of said second memory means to be stored in that memory element, and means for selectively energizing one of said first and second memory means.

62. A broadcast receiver according to claim 61; further comprising stop circuit means responsive to the attainment of a predetermined value by said content of the counter for halting the operation of said pulse generator.

63. A broadcast receiver according to claim 61; further comprising a stop pulse generator for producing a stop pulse when the content of said counter becomes a predetermined value, which stop pulse halts the operation of the first mentioned pulse generator, a second pulse generator having its operation started by said stop pulse, a circuit for applying pulses from said second pulse generator to said counter, readout means for reading out the memory stored in at least one of said first and second memory means, means for energizing said display means by the read-out from said read-out means, and a circuit for temporarily stopping the operation of said second pulse generator by means of said read-out.

64. A broadcast receiver according to claim 63; in which each of said indicator elements of said display means has manually operable switch means associated therewith.

65. A broadcast receiver according to claim 64; further comprising switch detector means for detecting the operation of said switch means, and a circuit for starting the operation of said second pulse generator in response to an output from said switch detector means.

66. A broadcast receiver according to claim 63; in which each of said indicator elements of said display means is a neon lamp and has a manually operable switch connected in parallel thereto.

67. A broadcast receiver according to claim 61; further comprising a manually actuable mode selecting switch, a second pulse generator operable to produce a single pulse on each actuation of said mode selecting switch, and means for applying the last mentioned pulse to said counter and to said display means.

68. A broadcast receiver according to claim 61; further comprising a manually actuable mode selecting switch, a second pulse generator operable to produce pulses so long as said mode selecting switch is actuated, and means for applying the last mentioned pulses to said counter and to said display means.

69. A broadcast receiver according to claim 61; further comprising a manually actuable mode selecting switch, a second pulse generator for producing pulses upon the actuation of said mode selecting switch, means for applying the last mentioned pulses to said counter for varying the content thereof, read-out means for reading out the memory stored in at least one of said first and second memory means, and means for halting the operation of said second pulse generator in response to the read out of a memory by said read-out means.

70. A broadcast receiver according to claim 69; further comprising means for restarting the operation of said second pulse generator a predetermined time interval following said halting of the operation by said read-out.

71. A broadcast receiver according to claim 69; further comprising means for applying said pulses produced by said second pulse generator to said display means.

72. A broadcast receiver according to claim 61; further comprising write signal circuit means connected to at least one of said first and second memory control circuit means and including a manually actuable switch, means for producing a pulse upon actuation of said switch, and means for applying said one address signal through said one memory control circuit means to the corresponding memory element of the respective memory means.

73. A broadcast receiver according to claim 61; in which each of said memory elements of said first and second memory means is a semiconductive element having first, second and third electrodes, said first electrode being connected to the respective memory control circuit means.

74. A broadcast receiver according to claim 73; in which each of said memory control circuit means includes potential varying means for varying the potential of said one address signal applied to said first electrode of said memory element in at least three steps.

75. A broadcast receiver according to claim 74; in which said potential varying means includes a resistive divider for varying said one address signal in two steps and a negative voltage source for obtaining a third step of said potential.

76. A broadcast receiver according to claim 75; in which said resistive divider is controlled by said detector output.

77. A broadcast receiver according to claim 73; in which said first, second and third electrodes of said memory element are supplied with said one address signal, the voltage of a power source and the other of said address signals, respectively.

78. A broadcast receiver according to claim 77; in which a read-out terminal is connected to said second electrode of said memory element for reading out the memory stored in said memory elements.

79. A broadcast receiver according to claim 61; further comprising circuit means for erasing the memory stored in each of said memory elements of a selected one of said memory means by applying thereto a predetermined potential.

80. A broadcast receiver according to claim 79; in which said erasing circuit means includes a negative voltage source and is controlled by said memory control circuit means associated with said selected memory means.

81. A broadcast receiver comprising frequency synthesizer means including a counter having a variable content and local oscillator means for generating a local frequency signal that is varied in accordance with said content of the counter, pulse generating means operative to vary the content of said counter, detector means operative to provide a detector output upon detecting the reception of radio waves, memory means including memory elements each corresponding to a respective content of said counter, and means made operative by said detector output for storing a memory signal in the one of said memory elements corresponding to the content of said counter which results in said detector output.

82. A broadcast receiver according to claim 81; further comprising display means including indicator elements each corresponding to a respective one of said memory elements, and means for energizing each of said indicator elements upon the storing of a memory signal in the respective memory element.

83. A broadcast receiver according to claim 82; further comprising control means for halting the operation of said pulse generating means when said content of the counter corresponds to a selected one of the energized indicator elements.

84. A broadcast receiver according to claim 82; further comprising control means for operating said pulse generating means until the content of said counter corresponds to the next memory element in which a memory signal is stored.

85. A broadcast receiver according to claim 82; further comprising control means for operating said pulse generating means with a predetermined pause in such operation at each content of said counter which corresponds to a memory element in which a memory signal is stored.

* * * * *